US011968928B2

(12) United States Patent
Gielis et al.

(10) Patent No.: US 11,968,928 B2
(45) Date of Patent: Apr. 30, 2024

(54) DEVICE FOR PICKING FRUIT HAVING AN IMPROVED ROBOT ARM

(71) Applicants: OCTIVA BELGIUM BV, Leuven (BE); OCTIVA GROUP B.V., De Lier (NL)

(72) Inventors: Dries Gielis, Everberg (BE); Pieter Dondeyne, Heverlee (BE); Sebastiaan De Backer, Mechelen (BE); Jan Anthonis, Haasrode (BE); Tom Coen, Zemst (BE)

(73) Assignees: OCTIVA BELGIUM BV, Leuven (BE); OCTIVA GROUP B.V., De Lier (NL)

( * ) Notice: Subject to any disclaimer, the term of this patent is extended or adjusted under 35 U.S.C. 154(b) by 893 days.

(21) Appl. No.: 16/319,073

(22) PCT Filed: Jul. 19, 2017

(86) PCT No.: PCT/EP2017/068187
§ 371 (c)(1),
(2) Date: Jan. 18, 2019

(87) PCT Pub. No.: WO2018/015416
PCT Pub. Date: Jan. 25, 2018

(65) Prior Publication Data
US 2020/0323140 A1    Oct. 15, 2020

(30) Foreign Application Priority Data

Jul. 19, 2016  (BE) .................................. 2016/5602
Sep. 21, 2016  (BE) .................................. 2016/5710
(Continued)

(51) Int. Cl.
*A01D 46/30* (2006.01)
*A01D 45/00* (2018.01)
(Continued)

(52) U.S. Cl.
CPC ............. *A01D 46/30* (2013.01); *A01D 46/24* (2013.01); *A01D 45/006* (2013.01); *B25J 15/10* (2013.01);
(Continued)

(58) Field of Classification Search
CPC ...... A01D 46/30; A01D 46/24; A01D 46/253; A01D 45/006; B25J 15/10; B25J 19/021;
(Continued)

(56) References Cited

U.S. PATENT DOCUMENTS 3,262,593 A * 7/1966 Hainer ................... B25J 9/1065
                                                  414/751.1
4,532,757 A    8/1985 Tutle
(Continued)

FOREIGN PATENT DOCUMENTS

CN          2749640 Y       1/2006
CN        108243720 A  *    7/2018 ............. A01D 46/22
(Continued)

OTHER PUBLICATIONS

Belgian Search Report from BE Application No. 201605602, dated Mar. 16, 2017.
(Continued)

*Primary Examiner* — Alicia Torres
(74) *Attorney, Agent, or Firm* — Workman Nydegger

(57) ABSTRACT

A device for picking fruit is provided with an optical detection means and a robot arm, fitted with a gripper mechanism. The processing unit actuates the robot arm to make the gripper mechanism move about the piece of fruit to be picked from below. Once grasped, the piece of fruit to be picked is rotated in such a way about a substantially horizontal axis that the stalk of the piece of fruit comes away from the plant.

21 Claims, 16 Drawing Sheets

(30) Foreign Application Priority Data

Sep. 22, 2016  (BE) .................................. 2016/5714
Mar. 22, 2017  (BE) .................................. 2017/5187

(51) Int. Cl.
*A01D 46/24* (2006.01)
*B25J 15/10* (2006.01)
*B25J 19/02* (2006.01)

(52) U.S. Cl.
CPC ..... *B25J 19/021* (2013.01); *G05D 2201/0201* (2013.01)

(58) Field of Classification Search
CPC ........ B25J 9/003; B25J 9/0045; B25J 9/0048; B25J 9/1065; B25J 9/23; B25J 9/0078; B25J 11/0045; B25J 18/00; B25J 18/02; B25J 18/04; G05D 2201/0201
See application file for complete search history.

(56) References Cited

U.S. PATENT DOCUMENTS

| | | | | |
|---|---|---|---|---|
| 4,548,544 A | * | 10/1985 | Van Appledorn | B21J 13/10 901/22 |
| 4,663,925 A | * | 5/1987 | Terada | B25J 19/021 414/730 |
| 4,718,223 A | * | 1/1988 | Suzuki | A01D 46/005 56/332 |
| 4,975,016 A | * | 12/1990 | Pellenc | B25J 19/023 414/730 |
| 8,306,663 B2 | * | 11/2012 | Wickham | A01D 46/30 700/259 |
| 10,464,217 B1 | * | 11/2019 | Phan | B25J 15/10 |
| 11,202,409 B1 | * | 12/2021 | Schroll | A01D 46/24 |
| 2016/0050852 A1 | * | 2/2016 | Lee | H04N 7/18 901/41 |
| 2016/0073584 A1 | | 3/2016 | Davidson et al. | |
| 2016/0161238 A1 | | 6/2016 | Pitzer | |
| 2017/0273241 A1 | * | 9/2017 | Salisbury | A01D 46/30 |
| 2018/0199502 A1 | * | 7/2018 | Briquet-Kerestedjian | A01D 47/00 |
| 2020/0396900 A1 | * | 12/2020 | Xiong | A01D 46/253 |
| 2021/0337733 A1 | * | 11/2021 | Dondeyne | B25J 9/1612 |
| 2021/0337734 A1 | * | 11/2021 | Jeanty | B65G 41/00 |

FOREIGN PATENT DOCUMENTS

| | | |
|---|---|---|
| EP | 2371204 A1 | 10/2011 |
| JP | 2012148380 A | 8/2012 |
| WO | 2016055552 A1 | 4/2016 |
| WO | 2016090012 A1 | 6/2016 |

OTHER PUBLICATIONS

Belgian Search Report from BE Application No. 201605710, dated Mar. 20, 2017.
Belgian Search Report from BE Application No. 201705187, dated May 19, 2017.
International Search Report and Written Opinion from PCT Application No. PCT/EP2017/068187, dated Oct. 9, 2017.
Office Action from corresponding Chinese Application No. 201780054038.9, dated May 19, 2021.

* cited by examiner

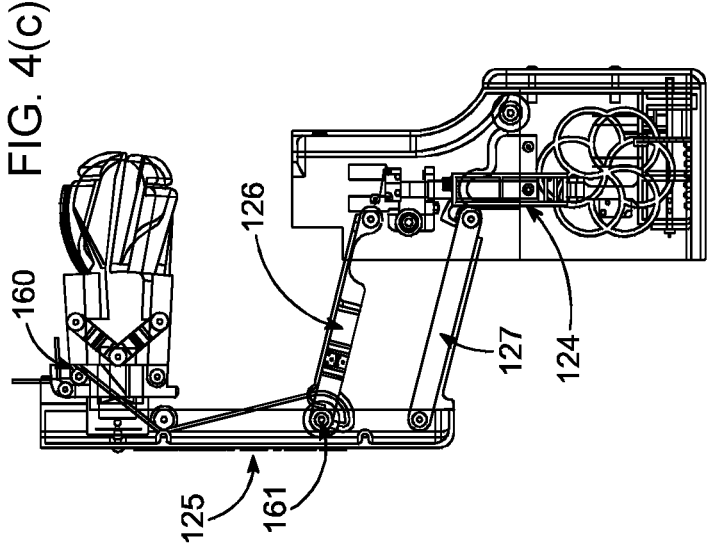
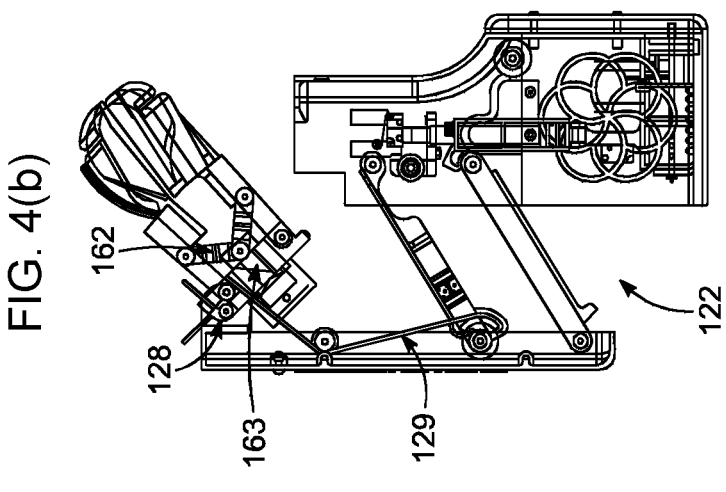
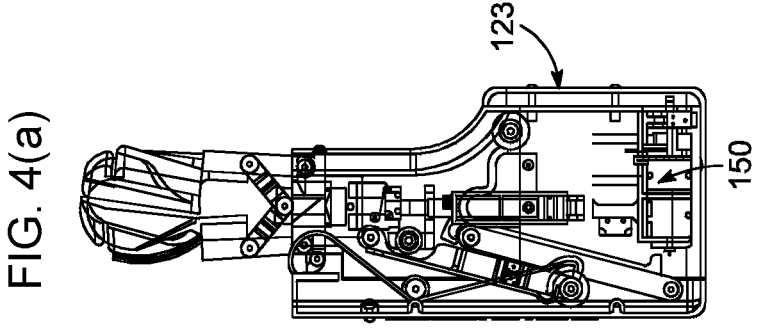

DEVICE FOR PICKING FRUIT HAVING AN IMPROVED ROBOT ARM

FIELD OF THE INVENTION

The present invention relates to tools for use in horticulture, more specifically to devices for picking fruit.

BACKGROUND

In fruit growing, the picking of the ripe fruit is an important and labour-intensive aspect of the production process. Even nowadays, this is still largely carried out by hand. In the last few years, attempts have been made to automate the fruit-picking process. EP 2371204 A1 thus discloses a machine for automatically harvesting fruit which is cultivated in rows. This machine accommodates a piece of fruit to be picked in a movable funnel and then cuts it from the plant. However, the use of machines, from EP 2371204 A1, is not suitable for very soft fruit, which is easily damaged during mechanized picking, and in which cutting off (cutting through) of the stalks is not desirable. For this reason, picking machines are still not being used nowadays for picking certain very soft types of strawberry, for example, such as those which are most interesting from a commercial point of view in Belgium. In addition, the known systems are not suitable to perform a simultaneous sorting operation.

A further robotic system comprising an end-effector for automatic harvesting of apples is known from US2016/0073584. The end-effector makes a horizontal approach along a specific azimuth angle to the fruit's position. Further systems for harvesting of apples, making use of a substantially horizontal or sideways approach are for example known from WO2016/055552 and WO2016/090012. Still a further system for harvesting fruit, such as citrus fruit is known from U.S. Pat. No. 4,532,757, which also makes use of a sideways approach of the fruit. Such systems all focus on fruit such as apples, citrus fruit, etc. which comprise an abscission point. Such an abscission point comprises fibres which weaken as the fruit ripens. As the fruit ripens the weakened fibres at the abscission point allow the fruit to detach naturally. Such systems are thus not well suited for harvesting of fruits or accessory fruits without such abscission point with weakened fibres as the fruit ripens, such as for example strawberries.

It is an object of embodiments of the present invention to at least partly address the abovementioned problems.

SUMMARY

According to an aspect of the invention, a device for picking fruit is provided, which is provided with: an optical detection means, configured to detect and spatially locate a piece of fruit to be picked and hanging from a plant; a robot arm, fitted with a gripper mechanism provided with at least two fingers; and a processing unit, operatively connected to the optical detection means, the robot arm and the gripper mechanism; in which the processing unit is configured such that it actuates the robot arm to make the gripper mechanism move at least partly about the piece of fruit to be picked in an upward movement from below or from a specific preferred orientation after a piece of fruit to be picked has been located by the optical detection means; and in which the processing unit is configured such that it actuates the gripper mechanism, when it has been positioned around the piece of fruit to be picked, in order to: grasp the piece of fruit to be picked between the at least two fingers; and rotate the piece of fruit to be picked in such a way about a substantially horizontal axis or about an axis situated in a plane which is at right angles to the direction of the stalk of the piece of fruit that it comes away from the plant.

In this application, the term "fruit" is used in its widest sense, without being limited to the strictly botanical meaning of this term. In particular, the term "fruit" also includes accessory fruit, such as strawberries, figs, rose hips and the like. The term "fruit" is also intended to mean fruit in the botanical sense of the word which are qualified as vegetables in current parlance, such as tomatoes, cucumbers and sweet peppers. The system is especially advantageous for such fruit or accessory fruit, which does not comprise an abscission, such as for example strawberries, as prior picking methods have proven less effective. Furthermore, specifically for fruit or accessory fruit, such as strawberries, the upward movement from below, is especially advantageous, as in this way the strawberry can be approached more efficiently and reliably. It is clear that, upwards from below should be interpreted as substantially upwards and from below, preferably vertically, upwards from below, or substantially vertically, upwards from below, for example with an angle which diverts less than 10°, preferable less than 5° from the vertical direction.

The present invention is based, inter alia, on the insight of the inventors that it is advantageous to keep the pressure exerted on fragile fruit during picking to a minimum by causing the fingers of the gripper mechanism to act on various locations distributed over the periphery and/or the stalk of the fruit. The present invention is furthermore based on the insight of the inventors that a fruit can be detached by means of a minimal pressure on the outer side and by not pulling in the direction of the longitudinal axis of the stalk of the fruit, but by rotating (tilting) the fruit, as a result of which the stalk snaps at the weakest point without the fruit being damaged. Both requirements are best achieved by approaching the fruit with a gripper mechanism consisting of several fingers.

The present invention is furthermore based on the insight of the inventors that the stalk of a fruit snaps most quickly in this case when the stalk is bent at angle of 70° to 110°, preferably an angle of approximately 90°, during removal of the fruit. In other words, the fruit can be detached from the plant with a minimal risk of damage if the fruit is rotated about an axis which is preferably in a plane at right angles to the direction of the stalk of the fruit, at an angle of 70° to 110°, preferably an angle of approximately 90°.

It is an advantage of the invention that the fruit can be picked undamaged, without the need for a cutting mechanism to cut the stalk. After all, systems requiring a cutting operation are usually less quick. Such systems also have a higher risk of damaging the fruit itself or neighbouring fruit, due to the difficulty of causing the cutting mechanism to cut the fruit off at the correct location on the plant. In addition, pathogens may be transferred between plants via the cutting surfaces.

In an embodiment of the device according to the present invention, the processing unit is configured such that it actuates the robot arm and the gripper mechanism to: rotate the piece of fruit after picking about a substantially horizontal axis; and deposit the piece of fruit in a resulting preferred orientation in a receptacle.

It is an advantage of the present embodiment that the fruit can be immediately put away in an optimum manner for storage after picking. In particular for strawberries, it is desirable for the fruit to be placed in the punnet with the calyxes turned downwards, so that the relatively pointy and completely red bottom side is directed towards the potential client.

In an embodiment of the device according to the present invention, the at least two fingers, on the side facing the piece of fruit to be picked, are provided with an elongate, elastically deformable surface, which surface is configured to assume, upon contact with the piece of fruit to be picked, a concave shape which, viewed in a vertical plane, at least partly follows the contour of the piece of fruit to be picked.

It is an advantage of the present embodiment that good contact can be made with the fruit to be picked while only a minimal pressure is exerted on the outer side of the fruit. This is particularly important with fragile fruit in order not to damage the fruit during picking. The inventors have furthermore discovered that with a flexible contact surface which is suitably designed, the average damage which is inflicted on the fruit to be picked does not vary continuously with the exerted force, but will follow a step function, such that there is a wide area range of force levels within which the fruit is hardly damaged. This offers the advantage that it is easier to determine a suitable operating point, and makes it possible to reduce damage to the fruit to a minimum.

With fruit which grows in clusters, it is possible to prevent contact with other fruit when approaching the fruit to be picked and returning to the discharge position of the fruit. Preferably, the outside of the fingers has a shape and flexibility which is such that it damages the other fruit as little as possible.

It is an advantage of the invention that, due to the compact dimensions of the device, the latter prevents contact with other fruit as much as possible when picking a fruit. Consequently, the device damages other fruit as little as possible.

In an embodiment, the device according to the present invention is furthermore provided with an advancing mechanism, designed to drive the device substantially horizontally along a straight line.

It is an advantage of the present embodiment that the device can be used in situations where large numbers of plants are arranged along substantially straight lines, for example in the traditional greenhouse cultivation and tabletop cultivation. The advancing mechanism may be provided with wheels driving on the ground, wheels which are adapted to drive on one or more rails, caterpillar tracks, sliders and the like. As, in the present embodiment, the device as a whole only has one degree of freedom of movement, it can be positioned relatively accurately. The present embodiment is suitable for implementation of a stable platform on a vehicle which is driven using a stop-and-go strategy.

According to an aspect of the invention, a use is provided for the above-described device for picking strawberries.

It is a characteristic of the varieties of strawberries which are common in Belgium that they grow in large clusters and are relatively soft. There is therefore a need for a solution for these varieties in which the pressure on the strawberry is minimal and the number of manipulations remains limited. The device according to the present invention meets these requirements, and thus offers a very suitable solution for strawberries. In the case of strawberries, use of the device according to the present invention, in which the fruit is picked using a tilting movement, has the additional advantage that the stalk will snap in the calyx, as would have been the case with manual picking. This prevents a section of stalk from projecting from the picked strawberry, which could damage other strawberries in the same punnet and which is unacceptable to commercial customers of, inter alia, Belgian strawberries.

According to an aspect of the invention, the above-described device is intended to be used for picking tomatoes.

It is a characteristic of certain tomato varieties that they are relatively soft. There is therefore a need for a solution for these varieties in which the pressure on the fruit is minimal and the number of manipulations remains limited. The device according to the present invention meets these requirements, and thus offers a very suitable solution for this fruit.

According to an aspect of the invention, the above-described device is intended to be used for picking fruit of the species *Capsicum annuum*.

It is a characteristic of certain varieties of the species *Capsicum annuum*, including certain sweet and chilli peppers, that they are relatively soft. There is therefore a need for a solution for these varieties, in which the pressure on the fruit is minimal and the number of manipulations remains limited. The device according to the present invention meets these requirements, and thus offers a highly suitable solution for this fruit. According to an aspect of the invention, the above-described device is intended to be used for picking the species *Cucumis sativus*, more specifically for picking cucumbers or gherkins.

It is a characteristic of certain varieties of the species *Cucumis sativus*, that the skin of the fruit is susceptible to damage. There is therefore a need for these varieties for a solution in which the pressure on the fruit is minimal and the number of manipulations remains limited. The device according to the present invention meets these requirements and thus offers a highly suitable solution for this fruit.

According to an aspect of the invention, the above-described device is intended to be used for picking fruit of the genus *Rubus*, more specifically for picking blackberries or raspberries. According to an aspect of the invention, the above-described device is intended to be used for picking fruit of the genus *Vaccinium*, more specifically for picking blueberries or cranberries. According to an aspect of the invention, the above-described device is intended to be used for picking fruit of the genus *Ribes*, more specifically for picking currants, gooseberries or blackcurrants.

It is a common characteristic of said varieties of the genuses *Rubus, Vaccinium* and *Ribes* that they are relatively soft. There is therefore a need for these varieties for a solution in which the pressure on the fruit is minimal and the number of manipulations remains limited. The device according to the present invention meets these requirements and thus offers a highly suitable solution for this fruit.

Further advantageous and/or optional embodiments of the invention have been provided by means of the dependent claims.

BRIEF DESCRIPTION OF THE FIGURES

These and other aspects and advantages of embodiments of the present invention will be described in more detail below with reference to the attached drawings, in which:

FIGS. 4a-c show three different positions of a part of the device according to a specific embodiment.

DESCRIPTION OF EMBODIMENTS

Figure 1:
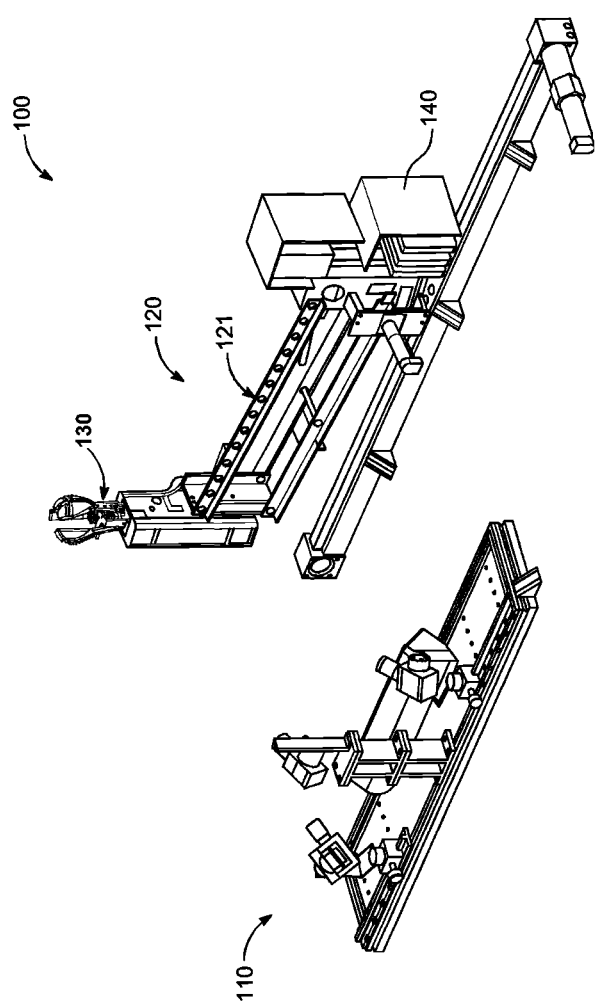
FIG. 1 shows an embodiment of the device according to the present invention.

FIG. 1 shows a diagrammatic representation of a device 100 according to an embodiment of the present invention. The device 100 comprises an optical detection means 110, configured to detect and spatially locate a piece of fruit to be picked and hanging from a plant. The optical detection means 110 may comprise, in particular, one or more digital cameras which supply images which are analysed in order to detect the fruit to be picked on the basis of shape, size, colour and/or other desired criteria. The detection may comprise, in particular, an assessment of the ripeness of the fruit, so that only ripe fruit is picked.

In addition or simultaneously, certain measurable characteristics of the fruit may be detected which may be used for a quality classification (e.g. size, estimated weight, uniformity of the colour, etc.). On the basis of this classification, the picked fruit can be correctly sorted immediately.

The spatial location of the fruit to be picked may be determined by combining the images of several cameras (stereoscopic location) or by applying other known location techniques. The one or more cameras are preferably arranged such that they can observe the fruit to be picked not only from the side, but also (obliquely) from below. This is particularly advantageous when picking strawberries, which grow in such a way that the ripe strawberries are usually hanging at the bottom of the plant. The reason for this is that strawberries grow on flower stems which develop successively and the later stems of which are always longer than the preceding ones. The flower stems initially grow upwards, but bend down due to the weight of the ripening strawberries which hang from them. The stems with the ripest (and usually largest) strawberries tend to sag furthest, so that the ripe strawberries hang at the bottom. With other plants having a similar fruit growth pattern, it is advantageous to arrange one or more cameras in such a way that they can observe the fruit to be picked (obliquely) from below.

The device furthermore has a robot arm 120, fitted with a gripper mechanism 130. The term "robot arm" is understood to mean a controllable movable unit which is able, on the basis of its degrees of freedom, to take a payload—in this case the gripper mechanism 130 with optionally a fruit—to a desired location within an operating range. The robot arm 120 is preferably of a light and thin design and may be configured as a parallelogram with hinged corners, which ensures a good balance between movability and stability. In an embodiment of the device, the robot arm 120 comprises an approach element 121 and a picking element 122. This is explained further in the context of FIGS. 4a-c. The gripper mechanism 130 is provided with at least two fingers. Advantageously, there is also at least one camera which forms part of the detection means 110 and is fitted on the robot arm 120, for example at the bottom of the cage of the gripper mechanism 130 formed by the fingers. The image from below which this camera supplies, contributes to mapping the fruit to be picked, and as this camera moves along with this robot arm 120, it may be used in particular to control the relative movement of the robot arm 120 with respect to the fruit to be picked more accurately. The device 100 furthermore has a processing unit 140 which is operatively connected to the optical detection means 110, the robot arm 120 and the gripper mechanism 130 by means of suitable interfaces.

This processing unit 140 is configured such that it actuates the robot arm 120 to make the gripper mechanism 130 move at least partly about the piece of fruit to be picked after a piece of fruit to be picked has been located by the optical detection means 110. The processing unit 140 is configured in such a way that any contact of the device 100 with other fruit, and the possible damage to the fruit which could result therefrom, is limited to a minimum.

In a specific embodiment of the invention, the gripper mechanism 130 approaches the fruit to be picked from below in an upward movement. This is particularly advantageous for picking strawberries, the fruit of which hangs at the bottom of the plant and is usually surrounded by other fruit.

In another embodiment of the invention, the gripper mechanism 130 approaches the fruit from a specific preferred orientation. The fruit is preferably approached from the side. This is particularly advantageous for picking fruit which grows on a plant in a plurality of orientations, as is the case with sweet peppers, for example.

When it has been positioned around the piece of fruit to be picked, the gripper mechanism 130 is actuated to grasp the fruit to be picked between the at least two fingers 131, 132 and to rotate (or tilt) it in such a way that it comes away from the plant.

During rotation of the fruit, the stalk of the fruit is bent at an angle of at least 40°, preferably at an angle of at least 50°, more preferably at an angle of at least 60°, still more preferably at an angle of at least 70°, and most preferably at an angle of at least 80°. The stalk is bent at an angle of at most 140°, preferably at an angle of at most 130°, more preferably at an angle of at most 120°, still more preferably at an angle of at most 110°, and most preferably at an angle of at most 100°. The best results are obtained when the stalk is bent at an angle of approximately 90°, in which the term "approximately" allows for a deviation of at most 5°, during picking.

Rotating the fruit at a certain preferred angle is based on the surprising insight that the fruit can be picked most advantageously, i.e. with the smallest risk of damaging the fruit itself or nearby fruit, if the stalk of the fruit is bent at a certain preferred angle. During rotation of the fruit, the stalk has to be put under tension. It has been found that, if the force characteristic builds up continuously in the stalk, the stalk will break off at the desired point. The inventors have furthermore discovered that the orientation of the stalk with respect to the axis of rotation during the rotation may also play an important part.

Putting and keeping the stalk under tension may be achieved by performing a certain combination of movements with the robot arm. With strawberries in the table-top cultivation, which are preferably picked from below, this can be achieved by moving the robot arm slightly downwards. This may be effected by controlling a certain combination of degrees of freedom of the robot arm, e.g. a combination of a rotation of the arm about a horizontal axis and a linear movement or a combination of two rotational movements. A preferred orientation of the stalk during the rotating movement with e.g. *Elsanta* strawberries is 90°.

The fruit is preferably rotated about an axis which is situated in a plane which is at right angles to the direction of the stalk of the fruit.

In this case, the gripper mechanism 130 is configured in such a way that the stalk of the fruit is subjected to bending at a predetermined desired break point during rotation about said axis. In other words, the gripper mechanism 130 is configured in such a way that both rotation about a predetermined break point of the stalk of the fruit and breaking at said point are activated. The inventors have found that the combination of determining a desired break point on a stalk and the selection of an optimum angle at which the stalk is bent, makes it possible to pick the fruit in a simple way, with the risk of damage to the fruit to be picked or to neighbouring fruit being reduced to a minimum.

For strawberries, this break point is the connection between the stalk and the calyx of the strawberry. When picking the strawberry, the stalk will break off in the calyx, so that no piece of the stalk projects from the picked strawberry. The absence of the stalk has the advantage that the risk of damage to other strawberries is reduced. It is thus clear that for a strawberry, or similar fruit or accessory fruit, which do not comprise an abscission, such a break point is not to be confused with an abscission.

In an alternative embodiment, the fruit is rotated about a substantially horizontal axis.

The device 100 may be provided with an advancing mechanism in order to drive it substantially horizontally along a straight line. The robot arm 120 has sufficient degrees of freedom to move with respect to this advancing mechanism. The unit then becomes a driving or sliding picking robot, which moves along, for example, rows of plants in a greenhouse. The travelling speed may be controlled autonomously as a function of the picking movements to be performed. The picked fruit may be deposited in a receptacle which is placed on the same trolley, or be conveyed to a central location via a conveyor belt for further processing (e.g. sorting, packaging, etc.).

Optionally, the advancing mechanism may operate on two mutually complementing levels: the picking robot is then configured to be on a moving or sliding platform which moves in a relative movement with respect to the ground, whereas the robot arm has an additional linear degree of movement in the same direction, but over a limited distance with respect to the platform, for example by providing a linear carriage. In this way, the platform may be used for the approximate positioning and the linear carriage for fine positioning.

The processing unit 140 may be implemented in specialist hardware (e.g. ASIC), configurable hardware (e.g. FPGA), programmable components comprising suitable software (e.g. microprocessors) or a combination of the aforementioned. The same components may also implement other functions, such as the detection and locating function, or parts thereof.

Figure 2:
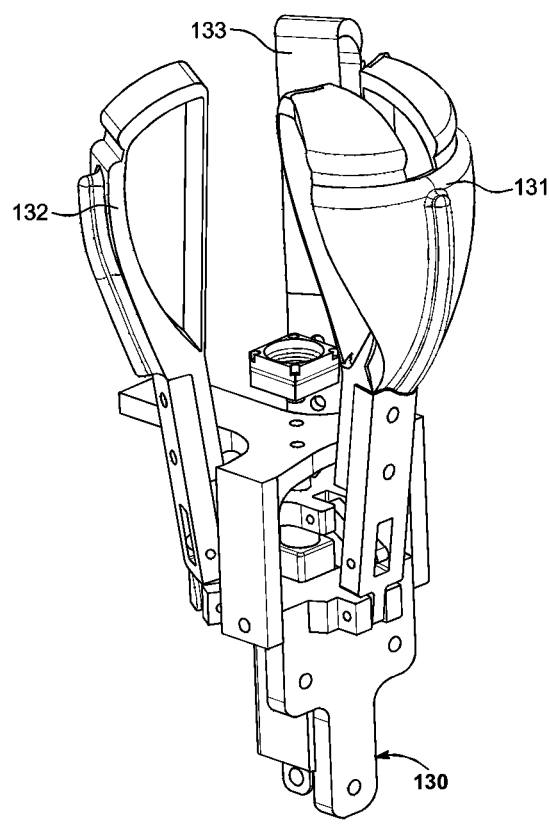
FIG. 2 shows an example of a gripper mechanism for use in embodiments of the device according to the present invention.
Figure 3:
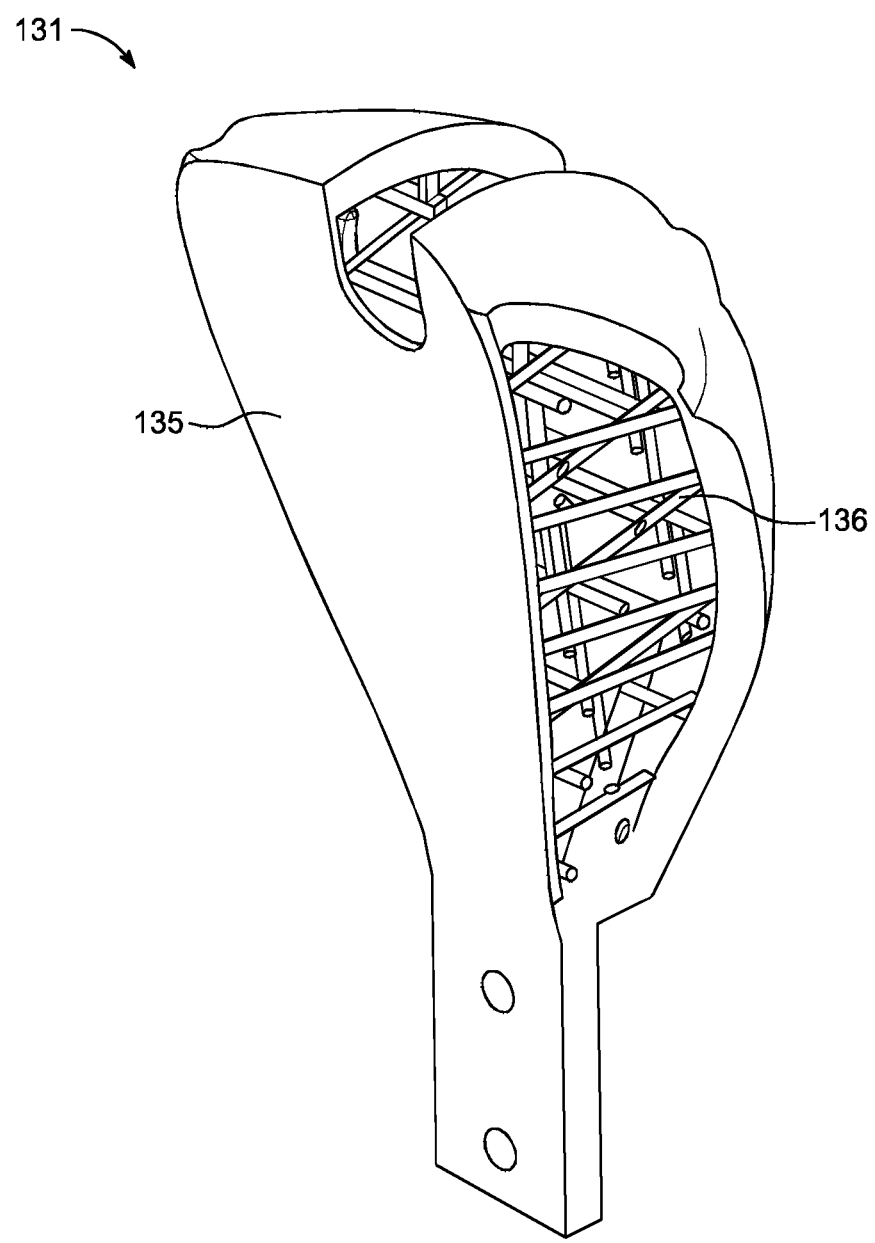
FIG. 3 shows a finger of the gripper mechanism from FIG. 2 in detail.

FIG. 2 illustrates an example of a gripper mechanism 130 for use in embodiments of the device according to the present invention. In an embodiment, the gripper mechanism 130 is provided with three fingers 131, 132, 133, as is illustrated here without loss of generality. The fingers are not necessarily identical. The fingers are preferably designed such that the pressure along the length of the finger, for a type15 fruit of a predetermined shape and size is constant. FIG. 3 illustrates a finger 131 of the gripper mechanism 130 from FIG. 2 in detail. The preferred properties which are described below with reference to FIG. 3 may be conferred on one or more fingers of the gripper mechanism 130, but preferably all fingers have these properties.

The fingers are preferably designed such that they damage the fruit as little as possible during picking and moving of the robot arm. Preferably, they have an elongate, elastically deformable surface 135 on the inwardly directed side (i.e. turned towards the fruit to be picked) which may be a strip of flexible material which is oriented along the longitudinal direction of the finger. This surface is configured, for example by the properties of the materials or structures 136 situated behind it, to assume, upon contact with the piece of fruit to be picked, a concave shape which, viewed in a vertical plane, at least partly follows the contour of the piece of fruit to be picked. The deformation properties of the surface 135 may be controlled in a very detailed manner by allowing the surface 135 to bear upon a plastic framework 136 which may be produced, for example, by means of additive manufacturing (3D printing). The configuration may in particular be optimized to follow the typical contour of the type of fruit for which the device is intended. A further reduction of the risk of damaging other fruit may be achieved by appropriate design of the outside of the fingers. The fingers have to have a certain pointedness and be provided with sufficient roundings. The material on the outside is preferably chosen such that it is sufficiently soft to cause a minimal risk of damage upon contact with other fruit. FIGS. 4a-c illustrate three different positions of a part of the device 100 during picking of a fruit in detail. The device 100 comprises a robot arm 120. The robot arm 120 is preferably of a light and thin design, so that the robot arm 120 can be moved upwards very quickly, and substantially at right angles, without unnecessarily coming into contact with other fruit.

Preferably, the robot arm 120 is provided with an approach element 121 and a picking element 122. The approach element 121 allows the gripper mechanism 130 to be taken to a suitable distance from the fruit to be picked and the fruit to be picked to be grasped between the at least two fingers 131,132. The picking element 122 allows the fruit to be rotated about a well-defined axis and in the process subject the stalk of the fruit to bending at a predetermined desired break point.

The approach element 121 may be provided with a housing 123, in which the picking element 122 may be stored. In such a way, the picking element 122 and the gripper mechanism 130 can be taken to a suitable distance from the fruit to be picked, without causing damage to the fruit itself or to any neighbouring fruit. In a preferred embodiment, the picking element 122 comprises a movable frame consisting of a base bar 124 and an action bar 125, in which the action bar 125 is hingedly connected in parallel with the base bar 124 via a pair of mutually parallel crossbars 126, 127. Due to this mutual connection, the action bar 125 can move in the plane defined by said bars with respect to the base bar 124. On the one hand, the presence of the pair of crossbars 126, 127 results in the action bar 125 remaining parallel with the base bar 124 during this movement, and on the other hand, that a change in the lateral distance between the action bar 125 and the base bar 124 (i.e. a change in the distance in the direction perpendicular to the action bar 125) is always accompanied by a change in the longitudinal distance (i.e. a change in the distance in the direction parallel to the action bar 125). The reason for this is that the connection point of the action bar 125 with a given crossbar 126, 127 can only move with respect to the connection point of the base bar 124 with the same crossbar on a circular arch whose radius equals the length of the crossbar 126, 127 between said connection points. In order to cause the action bar 125 to move in this plane, it is sufficient to drive one of the crossbars with a suitable first motor or actuator 150.

In a preferred embodiment, one of the crossbars 126, 127 is driven by the first motor or actuator 150 via a first pull cord (not shown in the drawing). The first pull cord preferably connects the first motor or actuator 150 to an attachment point which is connected to one of the crossbars 126, 127, preferably the bottom crossbar 127. Preferably, said attachment point is situated in the direct vicinity of the connection point of the action bar 125 with said crossbar 126, 127. Preferably, the first pull cord is guided over a cord-guiding wheel which is situated in the direct vicinity of the connection point of the base bar 124 with one of the crossbars 126, 127, preferably the top crossbar 126. In the preferred embodiment, the gripper mechanism 130 is arranged at a distal point 128 of the action bar 125, in which rotation about said distal point 128 in the plane defined by said bars is allowed. The longitudinal distance between the break point defined by the gripper mechanism 130 and said distal point 128 of the action bar 125 preferably equals the length of the crossbar 126, 127 between the abovementioned connection points. This causes the break point to remain in the same "absolute" position (with the base bar 124 as "absolute" reference point) when the crossbars 126, 127 rotate through an arbitrary angle from their rest position, provided that the gripper mechanism 130 simultaneously performs a similar rotation.

In the preferred embodiment, the picking element 122 is provided with a coordination means which coordinates the rotation of the gripper mechanism 130 with the rotation of the crossbars 126, 127. In a particularly preferred embodiment, the gripper mechanism 130 is rotationally pretensioned in the direction of the position in which the stalk of the fruit to be picked breaks, for example by means of a torsion spring. The desired coordination between the rotation of the gripper mechanism 130 and that of the crossbars 126, 127 can then be achieved by means of a second pull cord 129 which is provided to act in opposition to the force of the pretension. The second pull cord 129 is provided between a first cylinder 160, fixedly connected to the gripper mechanism 130, and a second cylinder 161, fixedly connected to one of the crossbars 126, 127, preferably the bottom crossbar 127. Preferably, the second pull cord 129 is guided over a cord-guiding wheel which is connected to the action bar 125. The length of the second pull cord 129 is chosen such that the gripper mechanism 130, counter to the pretensioning force, is forced into a longitudinally extended position when the movable frame is in the rest position. When the crossbars 126, 127 rotate through an arbitrary angle from their rest position, a part of the second pull cord 129 unwinds from the cylinder 161 on the crossbar 126, 127, which allows the torsion spring to rotate the gripper mechanism 130 in the picking direction through an angle which is determined by the amount of second pull cord 129 which can be wound onto the cylinder 160 of the gripper mechanism 130. At mutually equal diameters of the cylinders 160, 161, the angle which can be travelled by the gripper mechanism 130 will be equal to the angle which is travelled by the crossbar 126, 127.

In a preferred embodiment, the gripper mechanism 130 furthermore comprises a spring 162 and a second motor or actuator 163. The spring 162 is preferably connected to the at least two fingers 131, 132, 133 of the gripper mechanism 130. The gripper mechanism 130 is configured such that the spring 162 is tensioned when the at least two fingers 131,132,133 of the gripper mechanism 130 are open, in such a way that the spring 162, at rest, keeps the at least two fingers 131,132,133 of the gripper mechanism 130 in the closed position. The second motor or actuator 163 is configured in such a way that it induces a linear movement, preferably along the longitudinal axis of the gripper mechanism 130, which acts on a suitably selected portion of the at least two fingers 131,132,133. When the second motor or actuator 163 is activated, at least two fingers 131,132,133 are opened counter to the tension of the spring 162. It is an advantage of the present embodiment that the fingers 131, 132,133 remain passively closed, which keeps the gripper mechanism 130 as compact as possible during the movements which precede the picking. If the fingers 131, 132, 133 are in an open position, the second motor or actuator 163 prevents the picking mechanism consisting of the bars 125, 126, 127 from moving. The second motor or actuator 163 has a position in which the fingers are in the closed position, but in which the picking mechanism is still blocked. This prevents the picking mechanism from folding out while the robot arm is moving.

The specification of a "first pull cord" and a "second pull cord" in the above description is intended to clearly describe different functions, and does not rule out that these functions are fulfilled by a single pull cord.

Figure 5A:
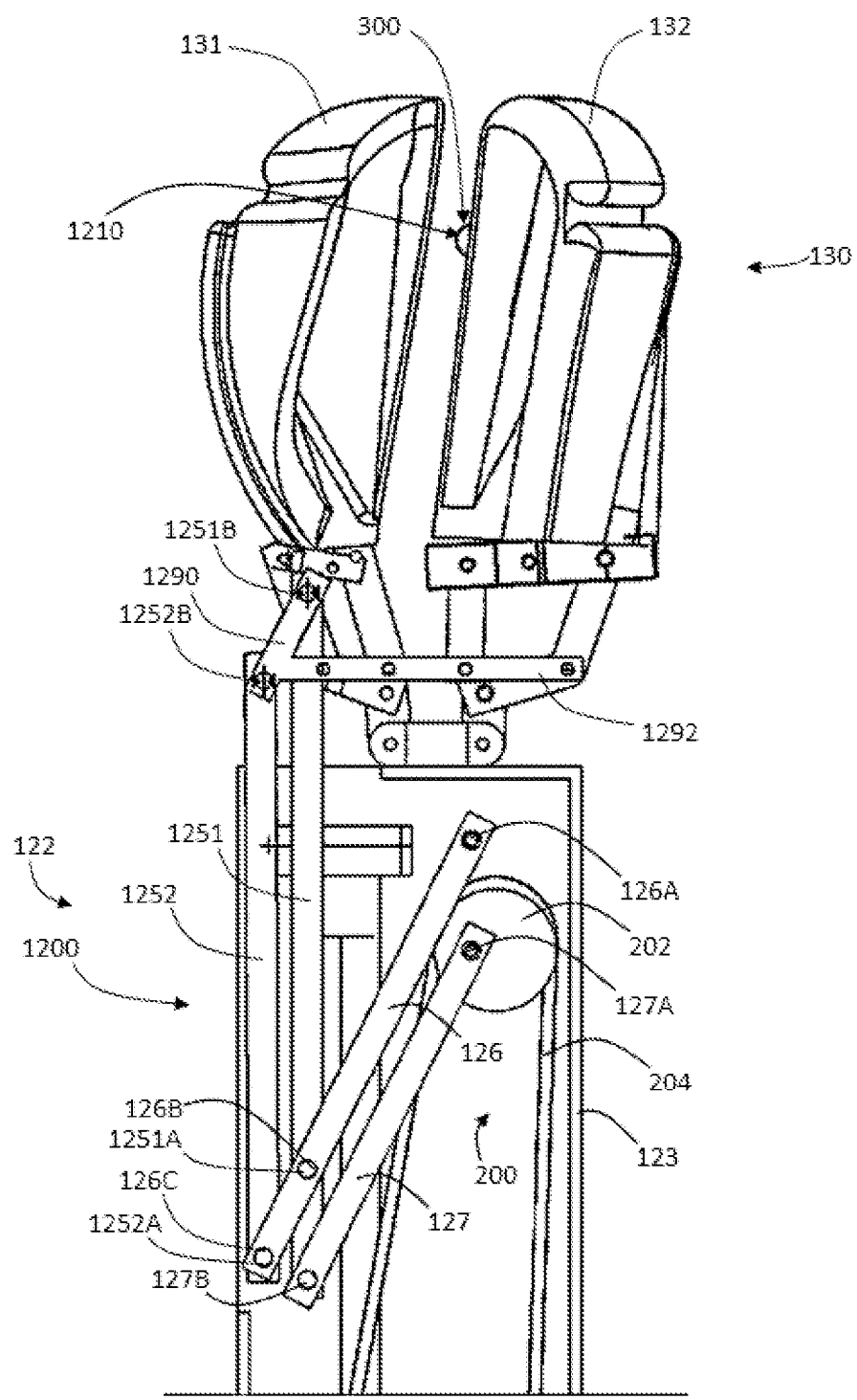
FIGS. 5a-c and 6-14 show an alternative embodiment of the device similar to the embodiment from FIG. 1 with an improved robot arm.
Figure 5B:
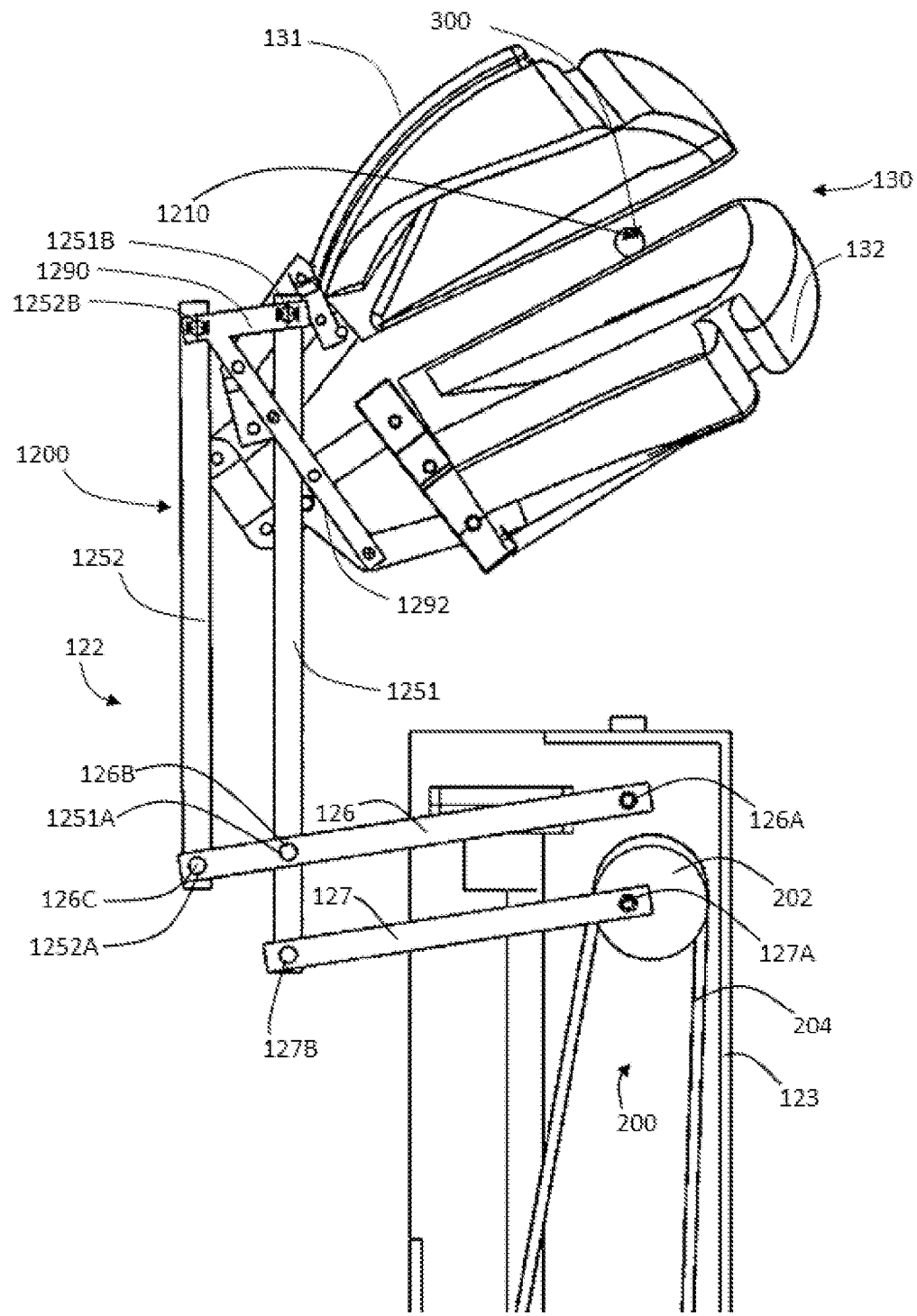
Figure 5C:
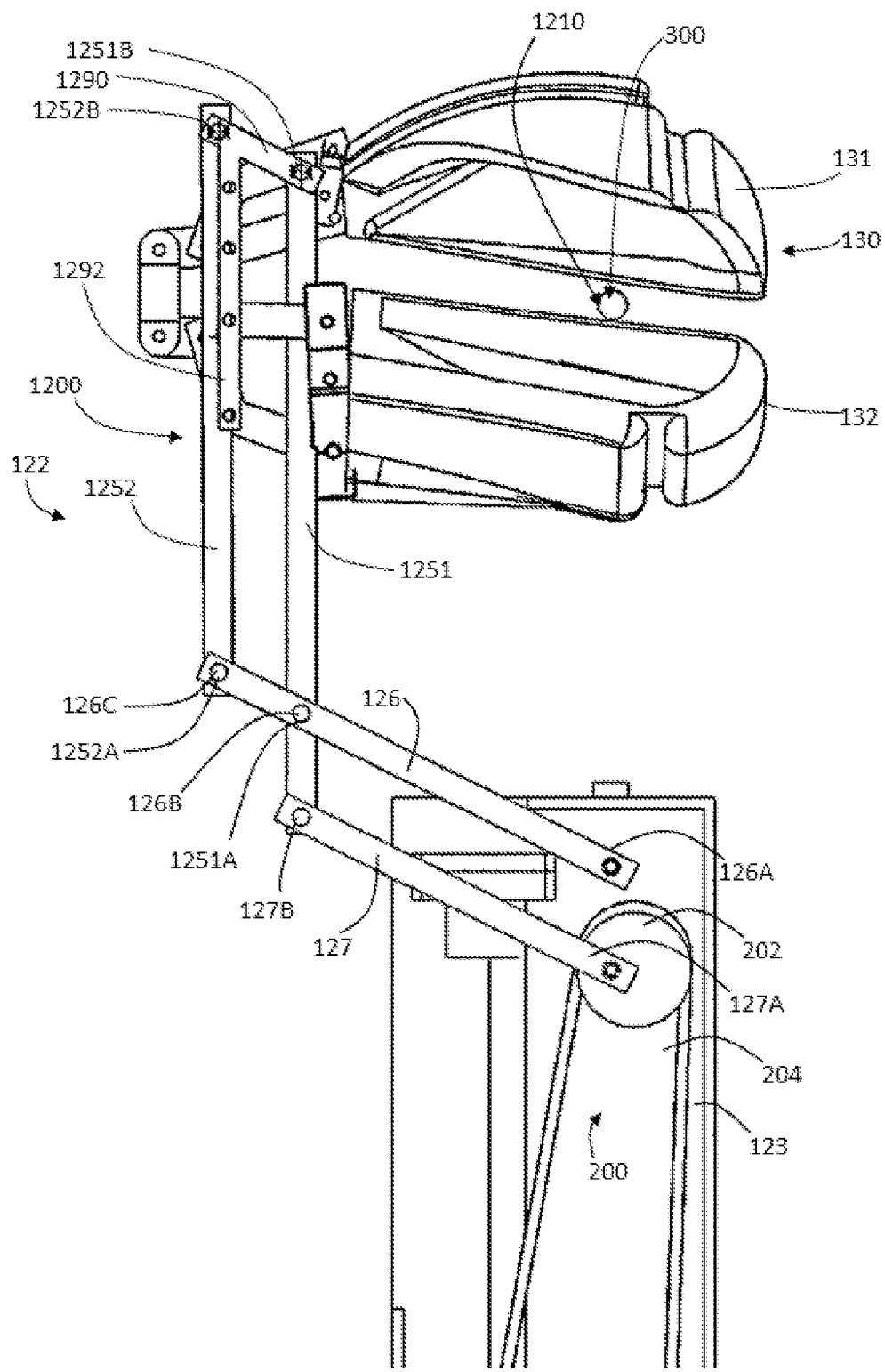
Figure 6:
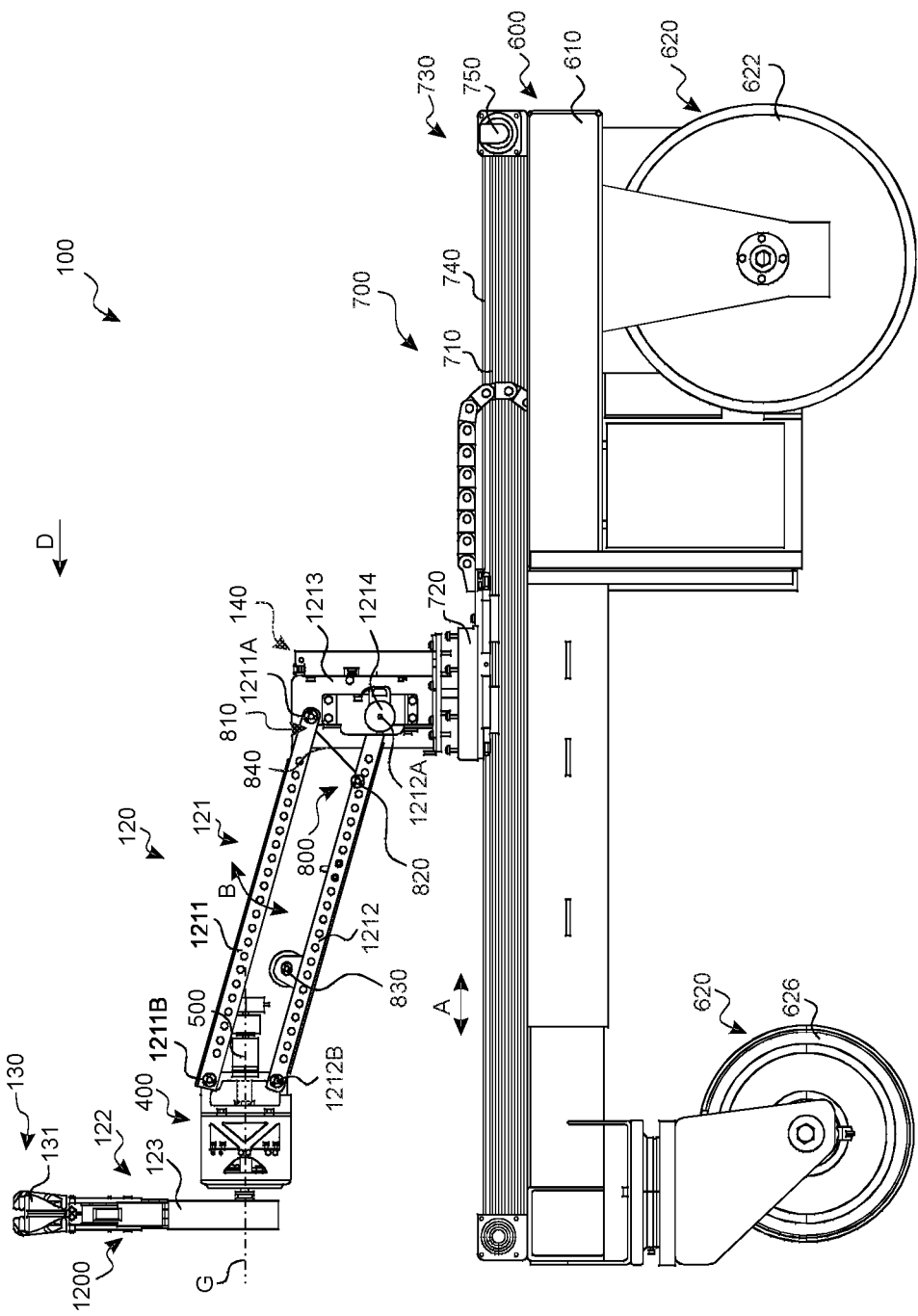

FIGS. 5*a*-*c* show an alternative embodiment of a picking element 122 of a robot arm 120, and a gripper mechanism 130, similar to the embodiment described in connection with FIGS. 4*a*-*c*. Similar components are denoted by identical reference numerals. Similar to the above description, FIGS. 5*a*-*c* show a housing or frame 123 which is fitted with a picking element 122 which has the function to rotate the gripper mechanism 130 in a suitable manner after it has clamped the fruit, so that the fruit to be picked is picked by subjecting the stalk of the fruit to a predetermined bend at a predetermined desired break point 1*xx*.

Similar to the description in connection with FIGS. 4*a*-*c*, the picking element 122 comprises a movable frame with a pair of mutually parallel crossbars 126, 127 which are rotatably attached on a first side in respective rotation points 126A, 127A on the housing 123. As is illustrated, according to the present embodiment, a drive mechanism 200 is arranged on the crossbar 127 to rotate this crossbar 127, and consequently also the parallel crossbar 126, about their respective rotation points 126A, 127A between two predetermined angular positions while performing the rotating movement of the gripper mechanism 130 about the desired break point 300 while performing the picking movement after a fruit to be picked was clamped in the gripper mechanism 130.

Similar to the description in connection with FIGS. 4*a*-*c*, according to the illustrated exemplary embodiment, during this phase of the picking movement, for example, a rotation of the gripper mechanism 130 from the angular position illustrated in FIG. 5*a*, in which the fingers 131, 132 of the gripper mechanism 130 are directed upwards, is rotated through an angle of 90° to the angular position illustrated in FIG. 5*c* via the angular position illustrated in FIG. 5*b*. However, it is clear that, as has already been mentioned above, alternative embodiments are possible to rotate the piece of fruit to be picked about the break point 300 through an angle preferably in the range from 70° to 110°, after it has been gripped by the gripper mechanism 130 during a picking movement. It will be clear that, while performing the picking movement, after moving the gripper mechanism 130 about the break point 300 from the angular position illustrated in FIG. 5*a* to the angular position illustrated in FIG. 5*c*, a rotation in the reverse direction of rotation may take place in order to move the gripper mechanism 130 back to the starting position illustrated in FIG. 5*a*. It will be clear that, similar to the description in connection with FIGS. 4*a*-*c*, the crossbars 126, 127 of the picking element 122, during such a phase of the picking movement, are rotated to and fro about their respective rotation points 126A, 127A on the housing 123, between the predetermined positions illustrated in FIGS. 5a and 5c, as described below in more detail.

According to the illustrated exemplary embodiment, the drive mechanism 200 comprises a pulley 202 which is driven by a suitable belt 204 connected to a second pulley (not shown), driven by, for example, an electric motor (not shown). It is clear that the pulley 202 is in this case driven in such a manner that the pulley 202 is rotated to and fro about the rotation point 127A between two predetermined angular positions. The crossbar 127 is connected to this pulley in such a way that this crossbar 127 in this case experiences a similar rotation about the rotation point 127, to and fro between two predetermined angular positions during the rotating movement of the gripper mechanism 130 about the desired break point 300. It will be clear that variant embodiments for the drive mechanism are possible, as long as the drive mechanism is configured to rotate both parallel crossbars 126, 127 to and fro between two predetermined angular positions in order to perform the desired rotating movement about the break point during a picking movement. According to an alternative embodiment, it is thus possible, for example, to arrange, for example, the pulley in order to rotate about the first rotation point 126A of the crossbar 126, or it is possible, for example, to use another suitable drive system to rotate the crossbars 126, 127 about their respective rotation points 126A, 127A, such as direct drive by means of a suitable actuator, or via an alternative coupling to an actuator via an alternative coupling, such as a gear wheel transmission, linkage system, etc.

On the opposite side of the respective crossbars 126, 127, a first action bar 1251 was arranged parallel to the line which connects both rotation points 126A and 127A of the respective crossbars 126 and 127. As can be seen, according to the illustrated embodiment, this first action bar 1251 is rotatably connected to the opposite side of these crossbars 126, 127 by respective rotation points 126B and 127B. It will be clear that the distance between rotation points 126A and 127A, is virtually equal to the distance between rotation points 126B and 127B, and that the line between the rotation points 126A and 127A is virtually parallel to the line between rotation points 126B and 127B, as a result of which the linkage system of the picking element 122 thus comprises two parallel crossbars 126, 127 which are rotatable about the respective rotation points 126A, 127A, and a first action bar 1251 which is arranged on these crossbars and which is in this case moved parallel to the line between both rotation points 126A, 127A, while the rotation points 126B, 127B move respectively on a circular arch around these rotation points 126A, 127A, with the radius of these circular arches, which corresponds respectively to the distance between the respective opposite rotation points 126A and 126B, and 127A and 127B, being virtually equal. It will thus be clear that the rotation points 126A, 126B, 127A and 127B in this case form a parallelogram and the parallel crossbars 126, 127 may be seen as forming part of a first parallelogram of a serial parallelogram-based linkage system 1200 of the illustrated embodiment of the picking element 122.

As illustrated, the rotation point 126B also forms a first rotation point 1251A on a first side of the first action bar 1251 for the illustrated embodiment. On the opposite side of the first action bar 1251, a second rotation point 1251B is arranged where this first action bar 1251 is rotatably connected to a third rotatable crossbar 1290. As illustrated, the linkage system furthermore also comprises a second action bar 1252 which, similar to and parallel to the first action bar 1251, is rotatably attached to a first end on the crossbar 126 in a rotation point 126C, which also forms the first rotation point 1252A of this second action bar 1252. Also similar to the first action bar 1251, the second action bar 1252 has a second rotation point 1252B at its opposite end, where this second action bar 1252 is also rotatably arranged on the third rotatable crossbar 1290. It will be clear that, in this case, the distance between the first and second rotation point 1251A and 1251B of the first action bar 1251 equals the distance between the first and second rotation point 1252A and 1252B of the second action bar 1252. It will furthermore also be clear in this case that the distance between the respective first rotation points 1251A and 1252A of the parallel action bars 1251, 1252 and the respective second rotation points 1251B and 1252B is also equal. It will thus be clear that these rotation points 1251A, 1251B, 1252A, 1252B also form a parallelogram and the action bars 1251, 1252 can thus be seen as forming part of a second parallelogram of a serial parallelogram-based linkage system 1200 of the illustrated embodiment of the picking element 122. It will furthermore be clear that the third transverse action bar 1290 of the linkage system 1200 is also parallel with both other transverse action bars 126, 127, as has been described above.

It will thus furthermore also be clear that, in order to produce the above-described embodiment of the rotating movement of the gripper mechanism 130 around the break point 300, the linkage system 1200 according to the illustrated embodiment will be moved to and fro between two angular positions as illustrated in FIGS. 5a-c, in which case all crossbars 126, 127 and 1290 remain parallel and all action bars remain parallel. It will be clear that in this case both action bars 1251 and 1252 remain parallel with the line through the rotation points 126A and 127A by means of which the respective first crossbar 126 and second crossbar 127 are rotatably arranged on the housing 123. It will furthermore be clear that, as has already been indicated above, during the picking movement illustrated in FIGS. 5a-c, the respective rotation points 1251A, 1252A on the first side of the parallel action bars 1251, 1252 will describe a circular arch around the rotation point 126A by means of which the first transverse action bar 126 is attached to the housing 123. The parallel action bars 1251, 1252 transfer this movement from the respective rotation points 1251A, 1252A to the respective rotation points 1251B, 1252B at their opposite end according to a respective circular arch. In this case, these rotation points 1251B, 1252B are moved on a similar respective circular arch around a centre 1210.

This centre 1210 is situated on the straight line through the rotation points 126A and 127B, that is to say a straight line parallel to the action bars 1251, 1252 on the same side and at the same distance from the rotation point 126A as the distance between the first rotation point 1251A, 1252A and the second rotation point 1251B, 1252B of the respective action bars 1251, 1252. It will furthermore be clear that this centre 1210 around which the rotation points 1251B and 1252B describe their circular arch also forms the rotation point around which the third crossbar 1290 is rotated. Although, according to the illustrated embodiment, the third crossbar 1290 has a length which does not extend as far as this centre 1210, it is clear that the prolongation of this third crossbar 1290, that is to say the straight line through the rotation points 1251B and 1252B of this third crossbar 1290, will intersect the straight line through the rotation points 126A and 127A, that is to say a straight line parallel to the action bars 1251, 1252 through the rotation point 126A or 127A, in this centre 1210. In other words, according to the illustrated exemplary embodiment, the centre 1210, together with the rotation points 1251B, 1251A and 126A, or 1252B, 1252A and 126A, respectively, or 1251B, 127B and 127A, respectively, also forms a parallelogram.

In this case, it will be clear that the centre 1210, just as the rotation points 126A and 127A, have a stationary position with respect to the housing 123. It will furthermore also be clear that the centre 1210 forms the rotation centre for all components which are arranged on the third crossbar 1290, since such components will, together with this third crossbar 1290, describe a circular arch, as is illustrated in FIGS. 5*a-c*, around this centre 1210, which is in a stationary position with respect to the housing 123 of the picking mechanism 122. The centre 1210 thus forms a remotely situated movement centre 1210 of the linkage system 1200, since the linkage system 1200 is configured to generate a rotating movement of components arranged on the third crossbar 1290 around the centre 1210 on the basis of a drive system 200 configured to generate a rotating movement around respective rotation points 126A, 127A which are situated at a predetermined distance from this centre 1210. These respective rotation points 126A, 127A as well as the centre 1210 may be regarded as being stationary with respect to the housing 123, and it will be clear that the mutual position with respect to this housing 123 does therefore not change, which is also true for their mutual distance.

It will thus be clear that the illustrated embodiment of the linkage system 1200 with a remotely situated movement centre 1210 is configured to rotate the gripper mechanism 130 arranged on the third crossbar 1290 to and fro around this centre 1210. According to the illustrated exemplary embodiment, the gripper mechanism 130 is arranged on this third crossbar 1290 by means of a connecting bar 1292 which is fixedly connected to this third crossbar 1290, so that this movement centre 1210 is located at a suitable position with respect to the gripper mechanism 130. According to the illustrated exemplary embodiment, the gripper mechanism 130 is arranged on this third crossbar in such a manner that the movement centre 1210 of the linkage system 1200 of the picking element 120 is located at a suitable position between the fingers 131, 132 of the gripper mechanism 130. In this case, it will be clear that, during the picking movement, this movement centre, also forms the centre 1210 for the rotating movement of the gripper mechanism 130 attached to the third crossbar 1290, as illustrated in FIGS. 5*a-c*.

As illustrated, it is thus advantageous in this case if the position of this remotely arranged movement centre 1210 of the linkage system 1200 of the picking element, and the installation of the gripper mechanism 130 on this linkage system, that is to say on the third crossbar 1290, is chosen such that this movement centre 1210 coincides with the break point 300 while performing the picking movement, after clamping the fruit to be picked in the desired position between the fingers of the gripper mechanism 130. It will be clear that, in this way, the linkage system 1200 of the picking element 122 makes it possible to rotate the fruit to be picked about the predetermined desired break point, such as for example a desired break point of the stalk of the piece of fruit, during the picking movement after the fruit to be picked has been clamped.

It will be clear that alternative embodiments of such a linkage system 1200 with a remotely arranged movement centre are possible. Thus, it is for example possible to choose an alternative equivalent combination of rotation points to produce a serial parallelogram-based linkage system similar to the illustrated exemplary embodiment in FIGS. 5*a-c*. It is for example possible, in addition to or instead of connecting both action rods 1251, 1252 with rotation points to cross rod 126, to connect both these action rods 1251,1252 with two rotation points to the parallel cross rod 127. It will be clear that still other embodiments are possible, in which a rod mechanism is produced in each case by a first parallelogram on the basis of parallel cross rods 126, 127 and a second parallelogram coupled thereto on the basis of parallel action bars 1251, 1252, so that a rotating movement of a third crossbar 1290 fitted thereto parallel to the parallel cross rods 126, 127 of the first parallelogram can be generated about the remotely situated movement centre 1210. It will be clear that still further alternative embodiments of linkage systems are possible, as long as it is generally a linkage system with one degree of freedom and a remotely situated movement centre 1210. Similar to the illustrated exemplary embodiment, such a linkage system is preferably configured in such a way that the remotely situated movement centre 1210 coincides with said break point 300. It will furthermore be clear that, with such linkage systems, similar to the above general description, the gripper mechanism 130 is arranged on the side of the linkage system 1200 facing the remotely situated movement centre 1210. On its opposite side, the linkage system 1200 is fitted on the housing 123 of the picking element 122. In this case, such a linkage system 1200 is generally, similar to the above description, operatively connected to a drive mechanism 200 configured to rotate the gripper mechanism 130 fitted thereto about the desired break point 300 via this linkage system 1200.

FIGS. 6 to 11 show an alternative embodiment of the device 100 similar to the embodiment illustrated in FIG. 1. Similar to the embodiment illustrated in FIG. 1, are denoted by the same reference numerals and have a similar function as described above. Similar to the embodiment of FIG. 1, the device comprises an optical detection means (not shown in FIGS. 6 to 11) for the spatial location of the fruit to be picked. Preferably, this optical detection means is arranged on the same platform 610 of the vehicle 600 as the robot arm 120. In this way, the fruit to be picked can preferably be observed from an angle from below, as has been described in more detail above. As has already been mentioned above, vehicle 600 forms a self-propelled platform which travels over the ground, for example along the direction of travel illustrated by arrow D. As illustrated, the vehicle 600 comprises wheels 620 to this end which are attached to the platform 610 and support this platform 610. According to an illustrated embodiment, the vehicle comprises a three-wheeled differential drive with two separately driven wheels 622, 624 on either side of the platform 610, viewed along the direction of movement D, and a swivel wheel 626 which rotatably supports the platform 610 on the opposite side of the platform 610 at a central position. It will be clear that numerous alternative exemplary embodiments are possible comprising three, four, five, six or more wheels, or other suitable propelling means, such as for example caterpillar tracks, omnidirectional wheel systems, etc. which can drive the platform forwards over the ground in a suitable manner. According to the illustrated exemplary embodiment, both separately driven wheels 622, 624 are driven, for example, by means of two suitable electric motors which are controlled by the controller or processing unit 140 to follow a suitable path on the ground in order thus to get sufficiently close to the fruit to be picked to make it accessible to the robot arm 120 arranged on the platform 610. According to the illustrated embodiment, as soon as the fruit to be picked is sufficiently within reach of the available movement range of the robot arm 120, the robot arm 120 can be taken to a desired horizontal position with greater precision in order to approach the fruit to be picked during a picking movement by means of the linear drive 700 arranged on the platform 610 of the vehicle 600. According to the illustrated embodiment, this linear drive 700 comprises a linear rail 710 on which a carriage 720 is arranged which is movable on this linear rail 710. As is illustrated, the movable carriage 720 is driven by means of a suitable belt drive 740 which in turn is driven by means of a suitable electric motor 750. It will be clear that alternative embodiments are possible, such as for example a drive mechanism which uses a lead screw, a direct linear drive, etc. in order to achieve an accurate positioning of the robot arm 120 with respect to the fruit to be picked to perform the picking movement along the direction indicated by arrow A. However, the belt drive 740 is advantageous since a suitable level of precision can be combined with the need for high speed.

Similar to the above description, the present embodiment of the robot arm 120 comprises an approach element 121 which is configured as a linkage system comprising two parallel approach rods 1211, 1212 which form a parallelogram with hinging corners 1211A, 1211B, 1212A, 1212B at their opposite ends. At their first end, the hinging corners 1211A, 1212A are arranged on a base frame 1214 which is provided on the movable carriage 720. As described above, the rotation points and the rods of the approach element 121 are configured in such a way that they enable an upward and downward movement of the picking element 122 with the gripper mechanism 130 attached at the other end. As illustrated, the rods 1211, 1212 of the approach element 121 are rotated about the respective rotation points 1211A, 1212A on the base frame 1213 by means of an actuator 1214 which is operatively connected thereto and attached to this base frame 1213. As can be seen, the controller 140 can drive this actuator 1214 in a suitable manner to move the picking mechanism up or down according to the direction illustrated by arrow B during a picking movement by means of the approach element 121.

It is clear in this case that the linkage system 1211, 1212 which forms a parallelogram is configured in such a way that the orientation of the part of the robot arm attached to the end of the approach rods 1211, 1212 moving up and down does not change during this up-and-down movement. That is to say that, in the illustrated exemplary embodiment, when performing an upward movement by means of the approach element 121 while approaching a fruit to be picked with the gripper mechanism 130, such as for example from the position illustrated in FIG. 6 to the position illustrated in FIG. 7, the orientation of the components attached to the end of the approach rods 1211, 1212 moving up and down does not change with respect to the platform 710 by the movement of these approach rods 1211, 1212. In other words, these components, that is to say according to the illustrated embodiment, the coupling 400 attached to the approach rods via rotation points 1211B, 1212B, the picking element 122 attached to this coupling 400 by its housing 123, and the gripper mechanism 130 attached to the picking element 122 move up and down according to a circular arch, but maintain their relative orientation with respect to the platform 710 of the vehicle 700. That is to say that, for example, parallel oriented planes or axes remain parallel with the platform 710 of the vehicle 700 during this up-and-down movement.

As can be seen, the present embodiment comprises a coupling 400 which attached housing 123 of the picking element 122 to the end of the approach element 121 which moves up and down. As illustrated, housing 123 of the picking element is rotatably attached to this coupling 400, for example by means of a suitably mounted rotary shaft, as will be described in more detail below, so that a rotation about an axis of rotation G becomes possible. As can furthermore be seen, an actuator 500 is also attached to the coupling 400 according to the present embodiment and is configured to be operatively connected to the housing 123 of the picking element in a first working position of the coupling 400 in order to bring about a desired angular rotation of the housing 123 about the axis of rotation G. According to the present embodiment, the coupling 400 is furthermore configured to uncouple the housing 123 from the actuator 500 in a second working position and to keep the housing 123 in its existing angular position with respect to the axis of rotation G. According to the preferred illustrated embodiment, the actuator 500 is operatively connected to drive mechanism 200 of the picking element 122 in this second working position of the coupling 400, so that the movement frame, for example in the form of the linkage system 1200, of the picking element 122 can perform a relative movement with respect to the housing 123 of the picking element 122. It will be clear that, in the first working position, the coupling is preferably configured such that the actuator 500 is active to rotate the housing 123 and the movement frame of the picking element 122 together about the axis of rotation G, so that they do not execute a relative movement with respect to each other.

In this way, both movements can be performed using one actuator 500. Reducing the number of actuators 500, in particular the number of actuators which is arranged on the housing 123 of the picking element 122, is advantageous since the picking movement is preferably executed as quickly as possible. In this case, it also has to be possible to bring the gripper mechanism 130 attached to the picking element 122 into the desired position in a stable manner. In order to guarantee this stability, in particular while performing a quick rotating movement about the axis of rotation G of the picking element, it is advantageous to reduce the inertia of the picking element. As a result thereof, the dimensions of the other elements of the robot arm 120, such as for example the drive 500, the approach rods 121 and their rotation points, etc. can be reduced, since the forces and torques which develop during a picking movement are reduced, without any adverse effect in respect of precision or stability with regard to positioning the gripper mechanism 130.

The illustrated embodiment in FIGS. 5 to 12 furthermore comprises, similar to the above description in connection with FIG. 1, a spring mechanism 800 which is configured to compensate for the torque caused by the weight of the components attached to the end of the approach element 121 which is movable up and down in order thus to reduce the holding force, as well as the torque which the drive 1214 has to generate. According to the illustrated advantageous embodiment, a spring system 800 is used which is connected by a first end to an approach rod 1212 and by another end to the housing 1213 of the approach mechanism 121, which can also be referred to as an approach element 121. As illustrated, the spring system 800 is guided via a deflection point 820 which is also attached to the approach rod 1212 at a position between both attachment points of the spring system 800 and in such a way that the spring system 800 is bent around this deflection point 820 in order to generate a resultant force there which counteracts the torque caused by the weight of the elements mounted on the movable end of the approach mechanism 121.

According to the illustrated exemplary embodiment, the spring system 800 comprises a pull cord 840, a first end 810 of which is connected to the base frame 1213 of the approach element 121. Preferably, as is illustrated in more detail in FIG. 13, this first end 810 of the pull cord 840 is positioned on the line between the first rotation point 1211A of the first approach rod 1211 and the first rotation point 1212A of the second approach rod 1212 of the approach element 121. Subsequently, this pull cord 840 is diverted via the deflection point 820 attached to the second approach rod 1212. It will be clear that the deflection point 820 is situated at a predetermined distance from the rotation point 1212A of this second approach rod 1212. At its opposite end, the pull cord 840 is connected to the end of a linear spring 830 which is also attached to the second approach rod 1212, at a distance from the rotation point 1212A which is greater than the distance from this rotation point 1212A to the deflection point 820. In this way, the resultant force caused by the spring system 800 in the deflection point 820 and consequently the resultant torque which acts on this deflection point 820 around the rotation point 1212A evolves in a similar way to the torque which is caused by the force of gravity around this rotation point 1212A in the various angular positions of the approach mechanism 121, as is for example illustrated in FIGS. 5-12. Preferably, as is illustrated, an optional guide mechanism 850 is also provided on the second approach rod 1212 at the location of the connection of the pull cord 840 and the end of the linear spring 830 in order to prevent the position of the end of this linear spring 830 from moving in an uncontrolled manner, in particular transversely with respect to the approach rod 1212 as a result of, for example, the quick movements of the approach mechanism 121 while performing a picking operation. It will be clear that alternative embodiments of the spring mechanism for the approach element are possible, as long as the approach element 121 generally comprises a spring mechanism 800 which acts on a deflection point 820 provided on the approach element 121 in such a way that the resultant torque evolves in a similar way to the opposite torque generated by the weight of the elements attached to the movable end of approach element 121, as is explained in more detail below with reference to FIG. 13.

Figure 9:
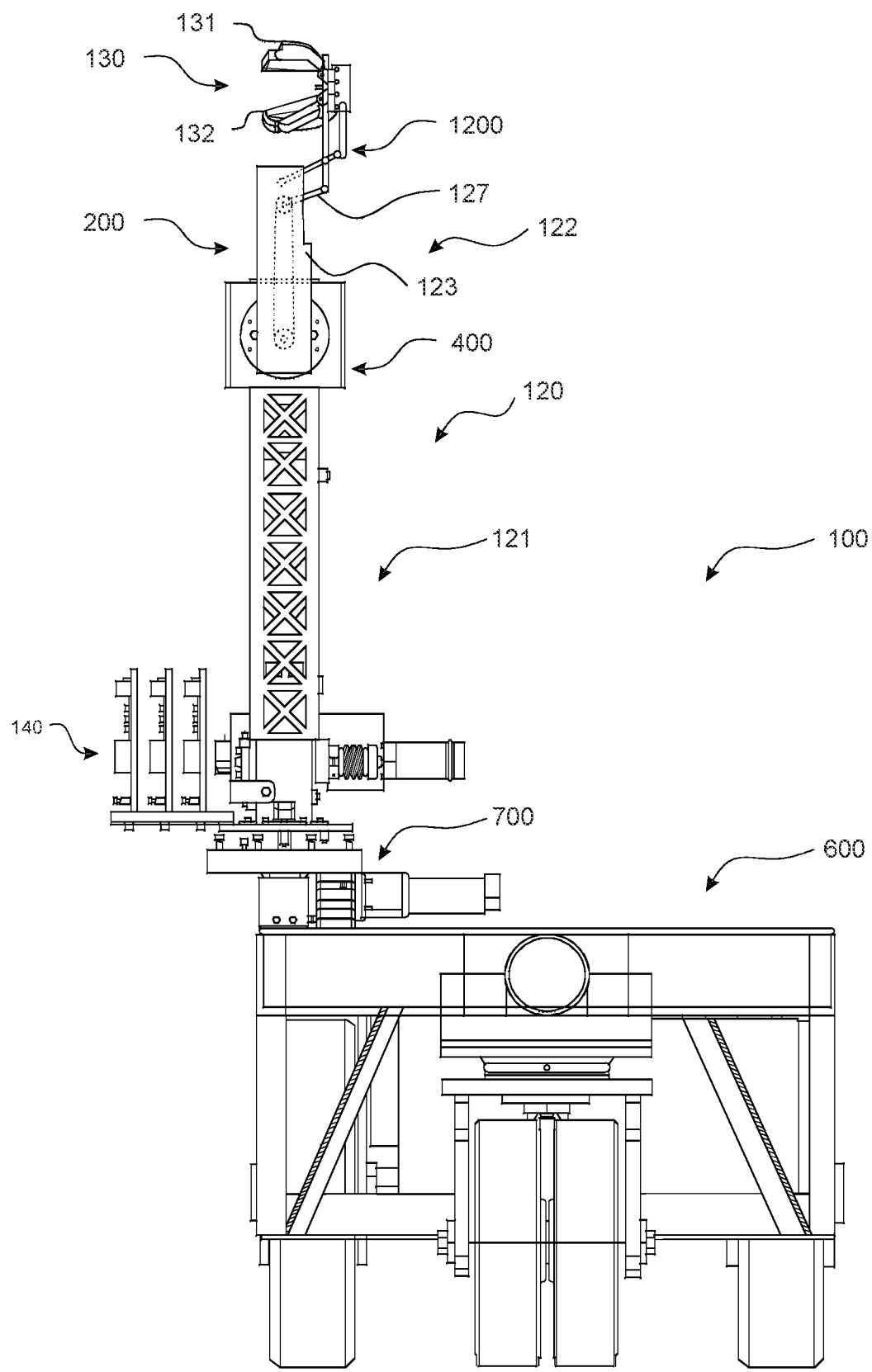
Figure 10:
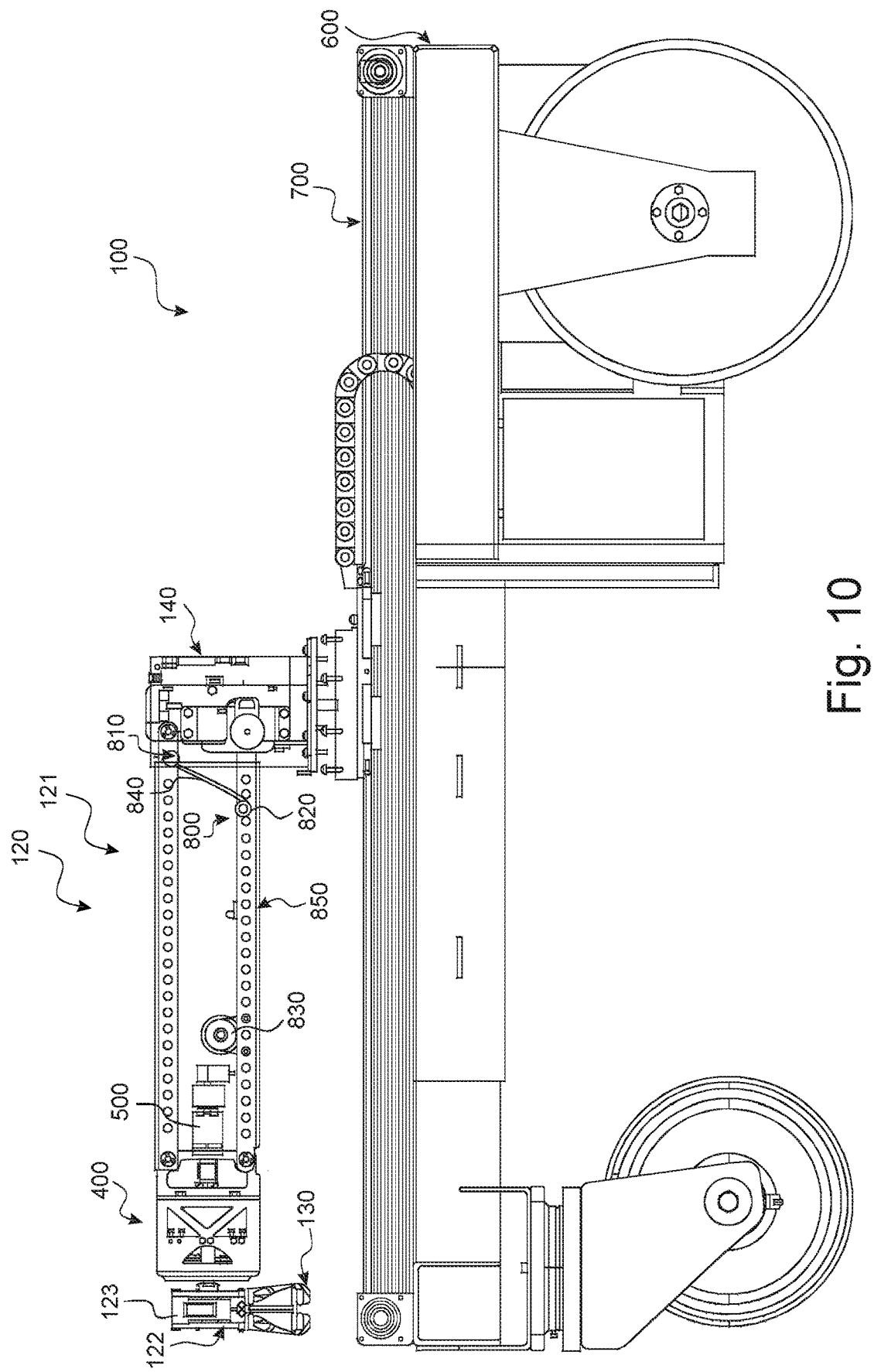

FIGS. 5 to 12 furthermore show some phases of an embodiment of a picking operation of the above-described embodiment of the device 100. The robot arm 120 is first moved from the position in FIG. 6 to the position in FIG. 7, in which case, as is illustrated, the housing 123 of the picking element 122 and the gripper mechanism 130 attached thereto are moved up in an upward orientation in order to approach the fruit to be picked from below. Subsequently, in the position illustrated in FIG. 8, the fingers 131, 132 of the gripper mechanism 130 will be opened in order to enable the fruit to be clamped in the gripper mechanism 130. Preferably, the fruit to be picked is clamped in the gripper mechanism 130 in such a way that, as has been described above, the predetermined break point 300 coincides with the remotely situated movement centre 1210 of the movement frame 1200 of the picking element 122. Subsequently, the picking element 122 generates an above-mentioned rotating movement of the gripper mechanism 130 and the fruit to be picked which is clamped therein about the break point 300, so that the fruit to be picked snaps off its stalk, as is illustrated in FIG. 9. Finally, the robot arm 120 is moved downwards again and the housing 123 of the picking element 122 and the gripper mechanism attached thereto are subjected to a rotation about the axis of rotation G, so that the fingers of the gripper mechanism 130 move to a downward orientation in order thus to release the fruit to be clamped again by opening the fingers, so that the fruit can be deposited in a receptacle, as mentioned above, in a suitable orientation, as illustrated, for example, in FIG. 10.

Figure 11:
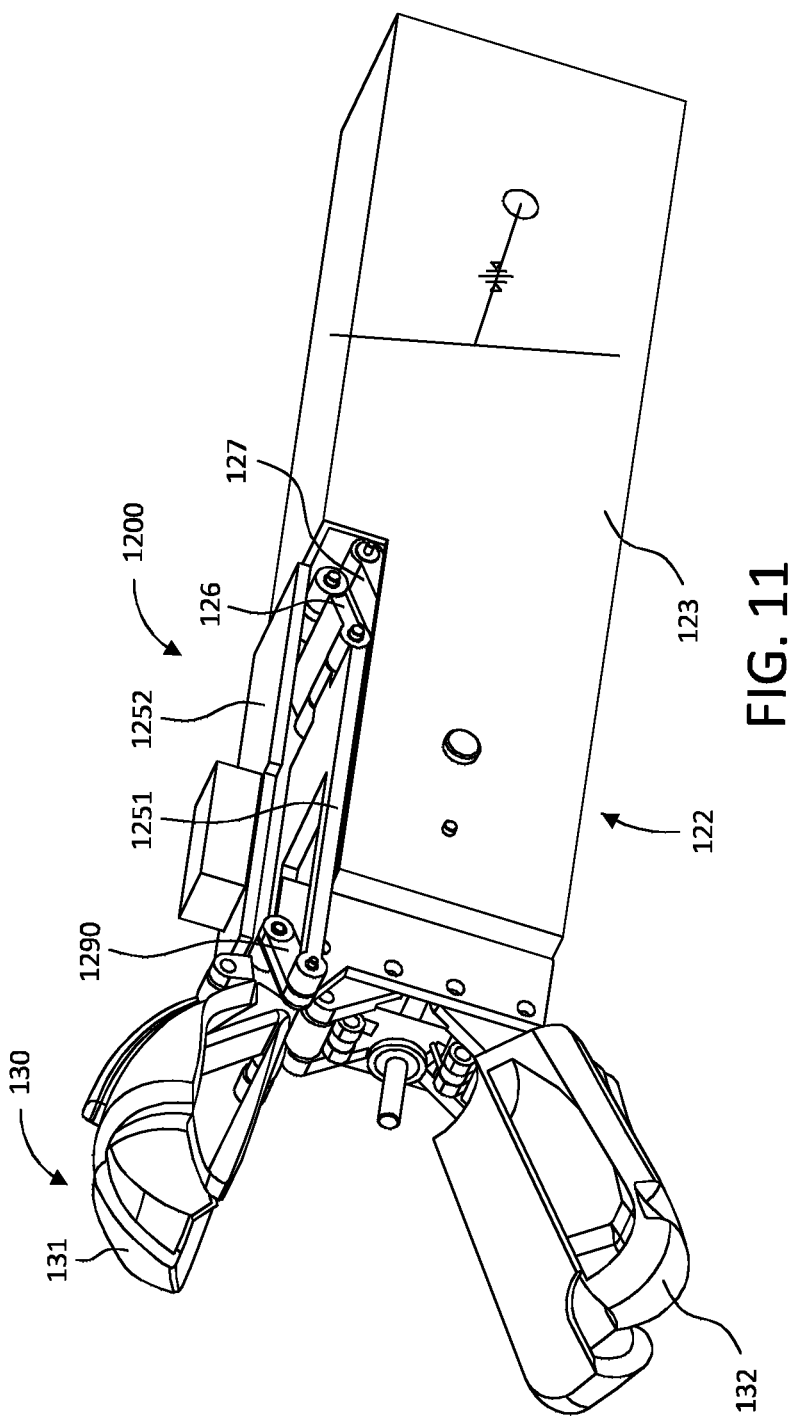
Figure 12:
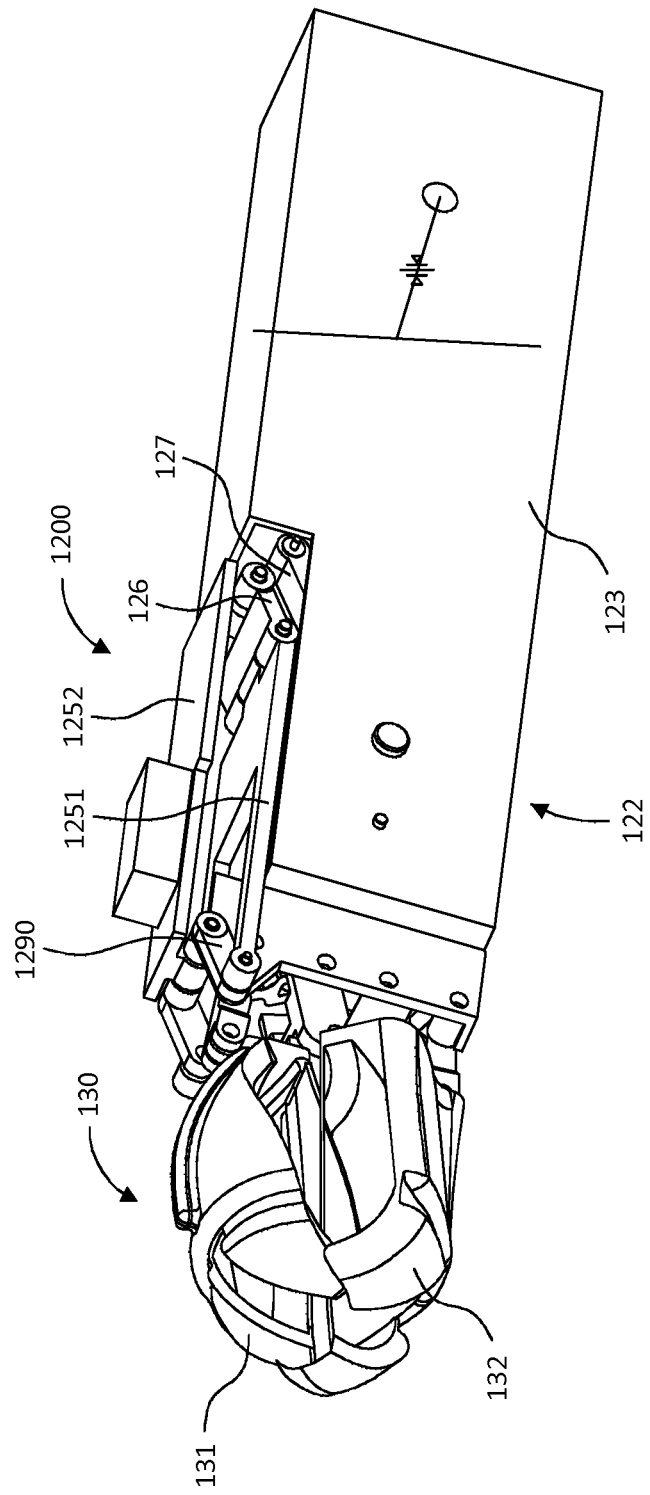

FIGS. 11 and 12 show the above-described embodiment of the gripper mechanism 130 and the linkage system 1200, similar to the embodiment illustrated in FIGS. 6*a*-*c*, again in more detail, in which FIG. 11 shows the open position of the gripper mechanism 130 and in which FIG. 12 shows the closed position of the gripper mechanism.

Figure 7:
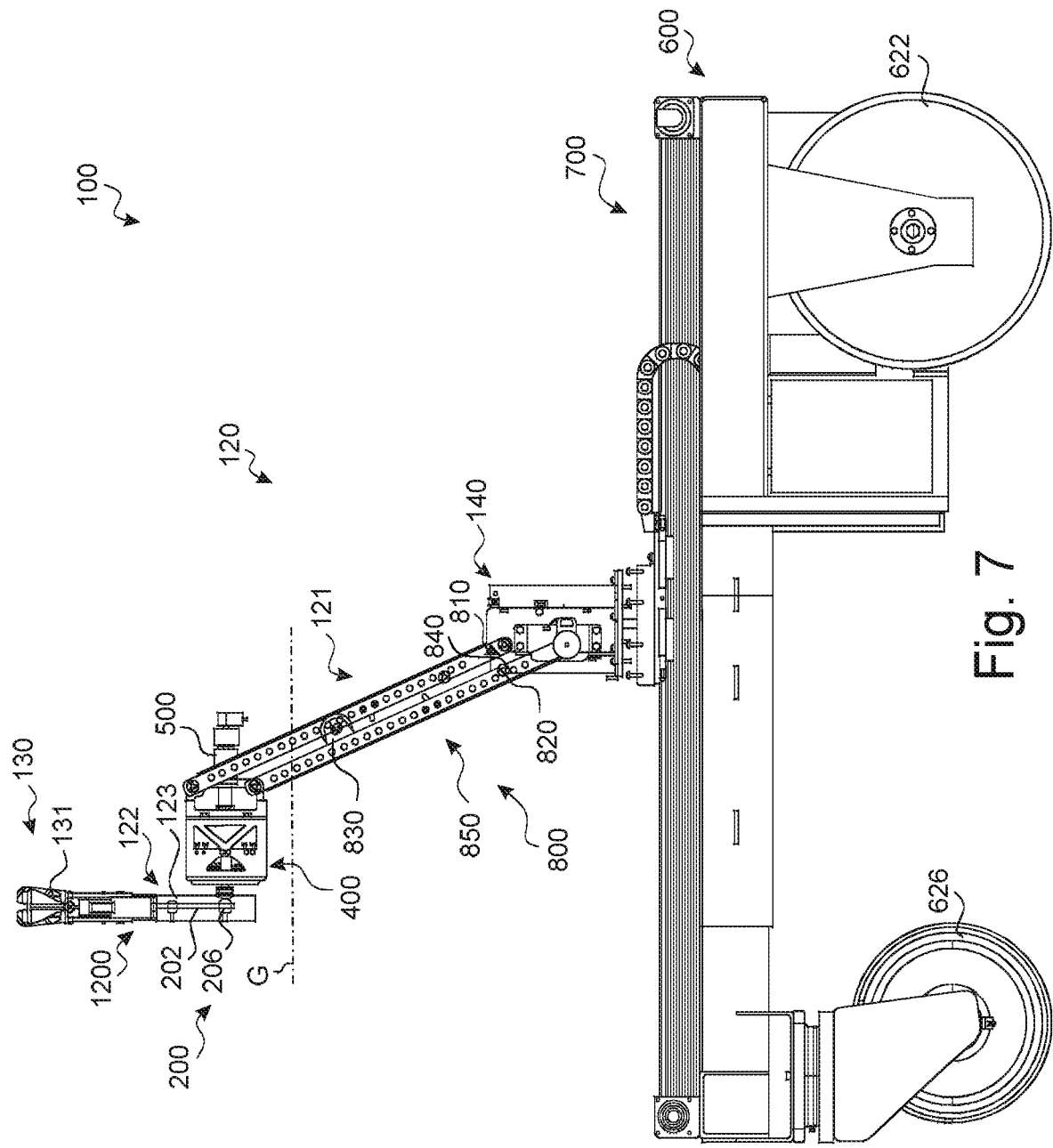
Figure 8:
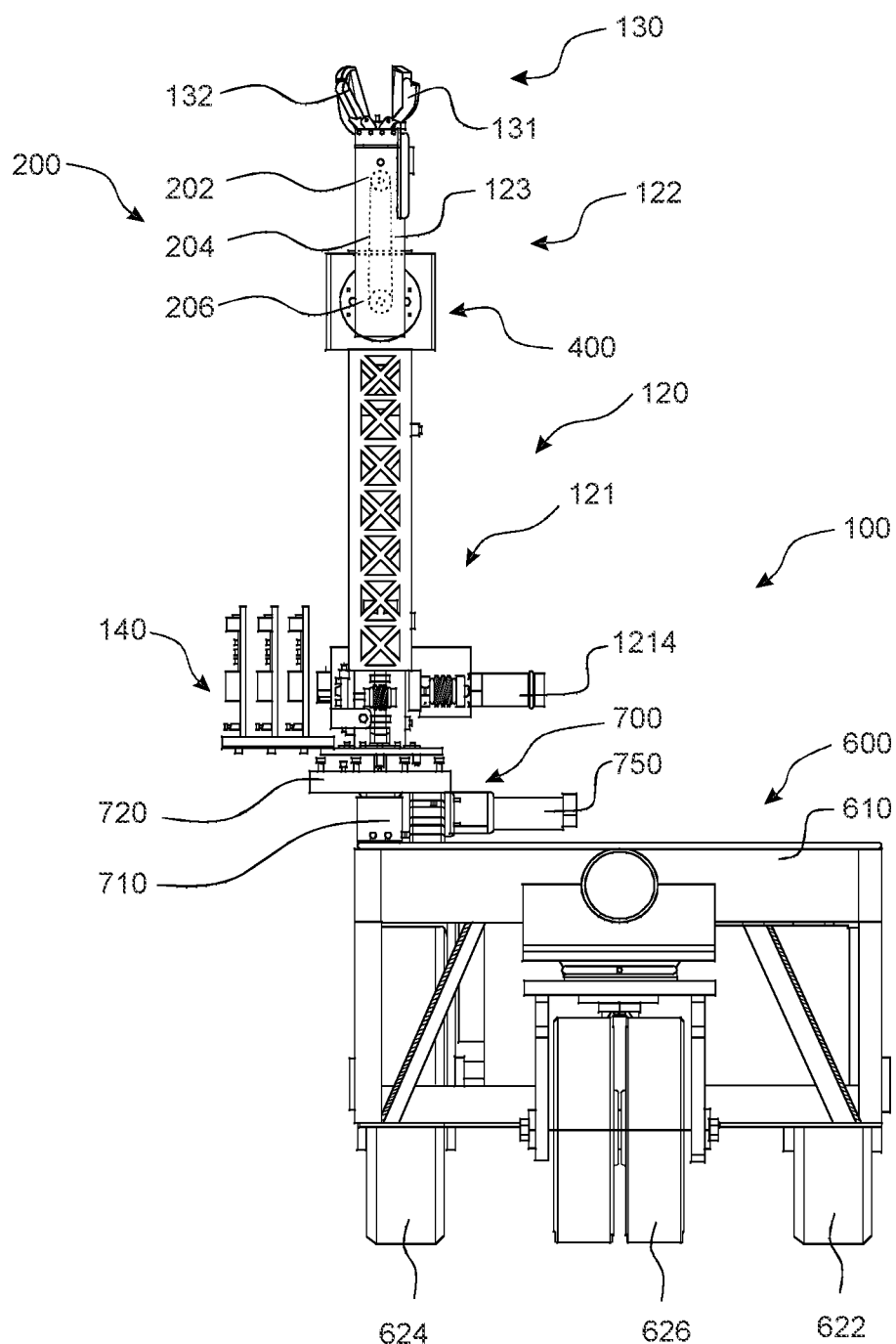
Figure 13:
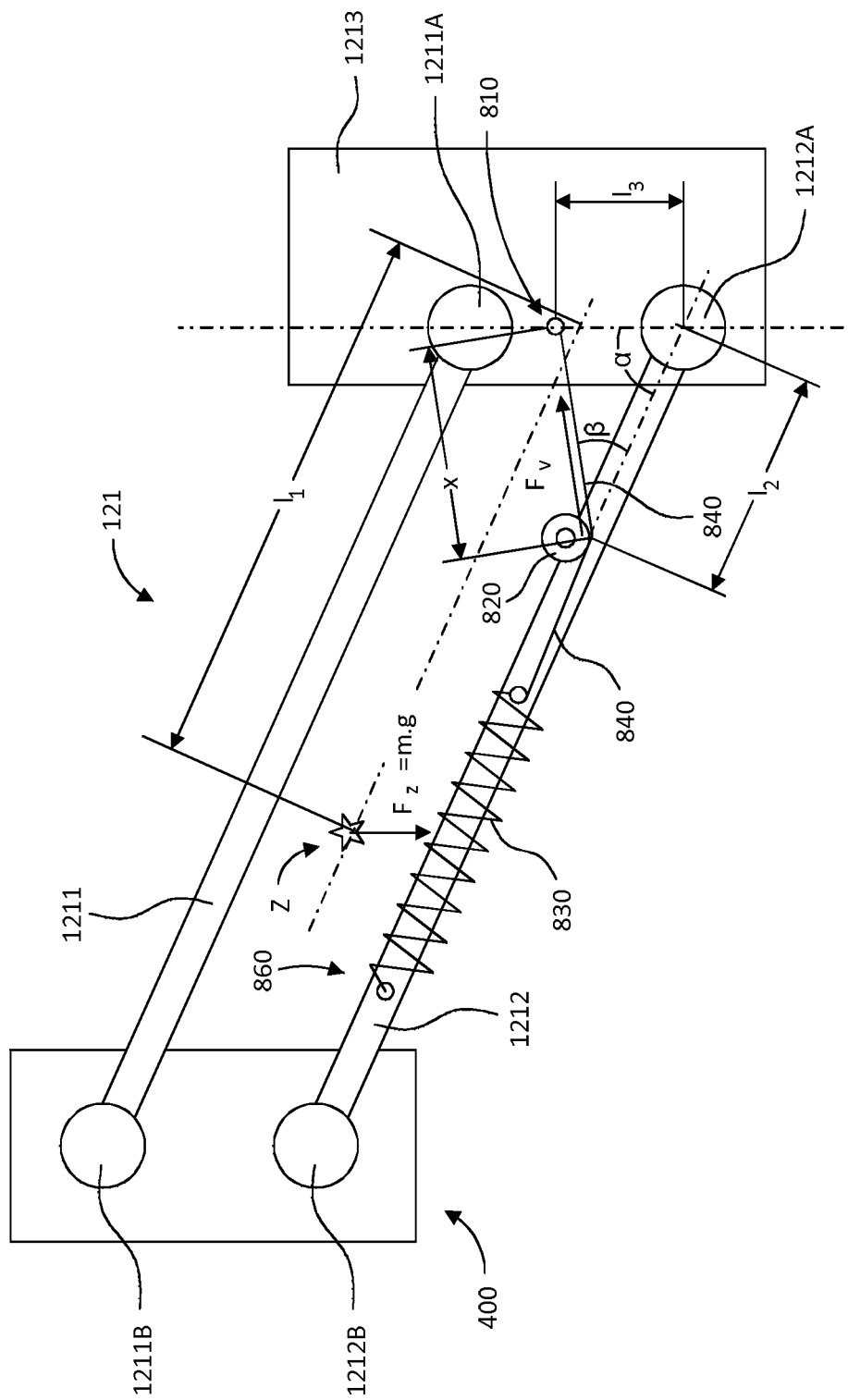

FIG. 13 shows the above-described embodiment of the spring mechanism 800 as well on an enlarged scale, the illustrated position virtually corresponds to the position illustrated in FIG. 7. FIG. 13 is limited to a diagrammatic representation of the elements of the robot arm 120 which are necessary to explain the operational principle of the compensation of the gravitational force. It will be clear that the elements which are not shown, such as for example the picking element 122, the gripper mechanism 130, etc., also have to be taken into account, for example when determining the position of the centre of gravity Z of the mechanism or the size of the mass which acts on this centre of gravity Z on account of the gravitational force $F_z$. The diagrammatically illustrated spring mechanism 800 comprises similar elements, as has already been described above in connection with the embodiment illustrated in FIGS. 6-12, which function in a similar way as has been described above and are denoted by the same reference numerals. The diagrammatically illustrated embodiment differs from the embodiments illustrated above in that it does not comprise an optional guide mechanism 850. The attachment point 810 of the spring system 800 on the housing 1213 of the approach mechanism 121 which, according to the illustrated exemplary embodiment, is formed by the first end 810 of the pull cord 840, is preferably situated, as illustrated, on the connecting line between the rotation points 1211A and 1212A, as mentioned above. The pull cord 840 is then diverted via the deflection point 820 arranged on the approach rod 1212 to a diagrammatically illustrated linear spring 830 which, at its other end, is also provided on this approach rod 1212, which in this case forms the opposite attachment point 860 of the spring mechanism 800. The position of the centre of gravity Z of the robot arm 120 is diagrammatically illustrated by means of the star symbol, as well as the gravitational force $F_z = m \cdot g$ which acts in this centre of gravity and is determined by the mass of the robot arm 120. It is clear in this case that the spring elongation x of the linear spring 830 corresponds to the distance between the deflection point 820 and the attachment point 810 on the base frame 1213. Furthermore, FIG. 13 diagrammatically indicates the spring force $F_v$ generated by the linear spring 830 as a function of the spring elongation x by arrow $F_v$. Furthermore, the angle β is also diagrammatically defined between the longitudinal direction of the approach rod 1212 and the longitudinal direction of the pull cord 840 between the deflection point 820 and the attachment point 810. Furthermore, the diagrammatically illustrated angle α is also defined as the angle between the straight line between the attachment point 810 and the rotation point 1212A of the approach rod 1212 and the longitudinal direction of the approach rod 1212. It will be clear that, in this way, the moment equilibrium between the moment generated by the gravitational force and the moment generated by the spring mechanism 800 around the rotation point 1212A of the approach rod 1212 may be expressed by the following equation: $m \cdot g \cdot l_1 \cdot \sin(\alpha) = F_v \cdot l_2 \cdot \sin(\beta)$. In this case $l_1$ is the distance between the centre of gravity Z and the connecting line between both rotation points 1211A and 1212A. In this case $l_2$ is the distance between the deflection point 820 and the rotation point 1212A. Furthermore, it is clear from the diagrammatical overview illustrated in FIG. 13 that:

The spring elongation x corresponds to opposite side of the angle α.

The force generated by the linear spring 830 with a spring constant k may be expressed as follows as a function of the spring elongation x: $F_v = k \cdot x$ As a result thereof, the equation of the moment equilibrium may be rewritten as follows: $m \cdot g \cdot l_1 \cdot \sin(\alpha) = k \cdot x \cdot l_2 \cdot \sin(\beta)$. Furthermore, by applying the sinus rule which applies to random triangles, and which determines that the ratio of the length of a side and the sinus of the opposite angle is identical for every angle of the triangle, the following may be determined, on the basis of the diagrammatical illustration in FIG. 13:

$$\frac{\sin(\alpha)}{x} = \frac{\sin(\beta)}{l_3} \text{ or } l_3 \cdot \sin(\alpha) = x \cdot \sin(\beta).$$

In this case, $l_3$ is defined as the length between the rotation point 1212A and the attachment point 810 of the spring system 800 on the base frame 1213.

Herewith, $\sin(\beta)$ in the equation of the moment equilibrium may be rewritten as a function of $\sin(\alpha)$, as a result of which it is clear that the angular dependency can be omitted from the equation of the moment equilibrium. It is thus clear that it is possible to arrive at a desired gravitational force compensation by suitably choosing the following constants in the equation of the moment equilibrium, namely the spring constant k, the lengths $l_2$ and $l_3$.

Figure 14:
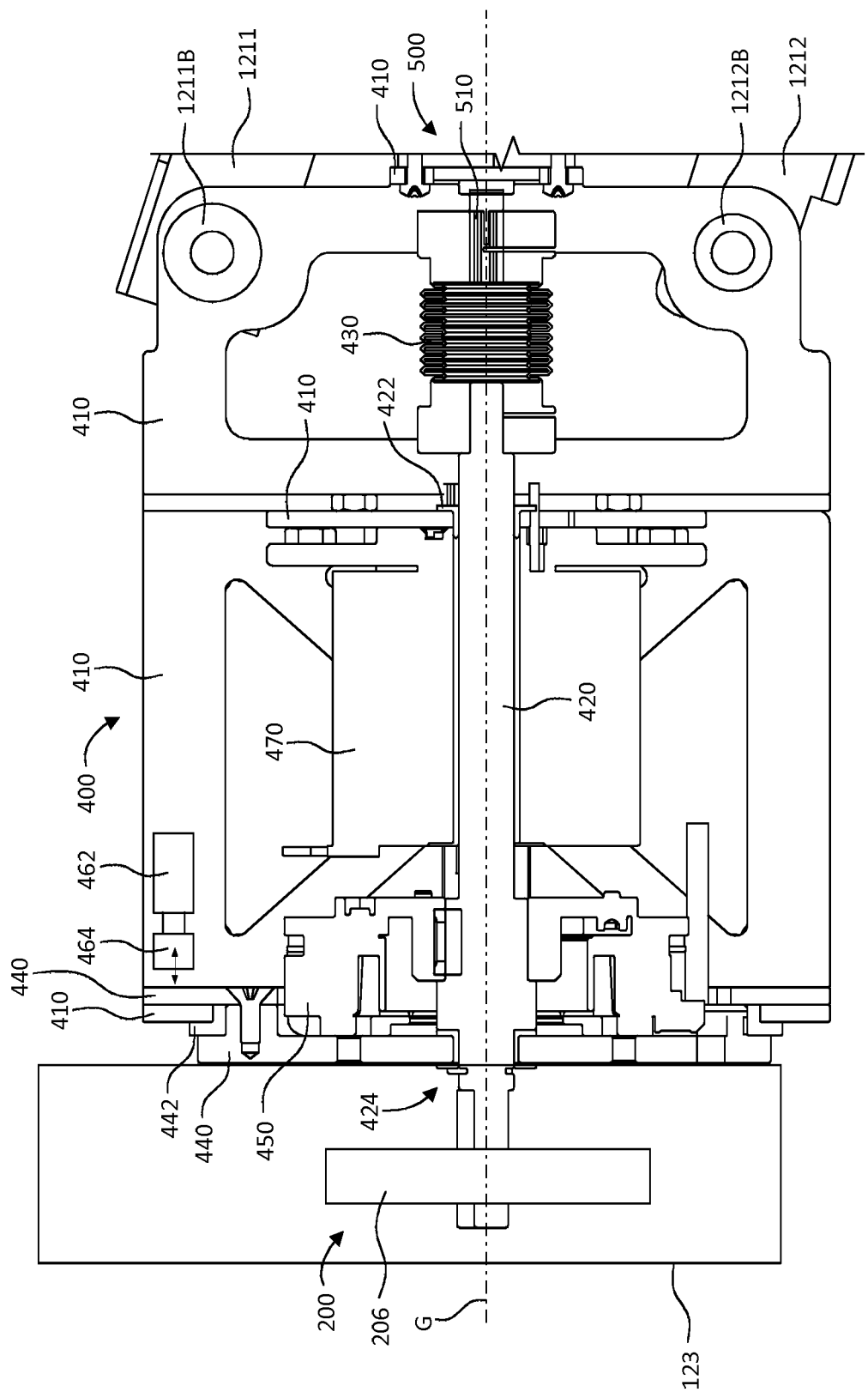

Finally, FIG. 14 illustrates an embodiment of the above-mentioned coupling 400 in more detail. According to the present embodiment, the coupling 400 comprises a frame 410. In this frame 410, a rotary shaft 420 is rotatably arranged along the axis of rotation G. As can be seen, at an end facing the actuator 500, the rotary shaft 420 is rotatably mounted in the frame 410 by means of a suitable bearing 422. As can furthermore be seen, the end facing the actuator 500 is connected, via a flexible coupling 430, to the drive shaft 510 of the actuator 500 which is also provided on the frame 410. It will be clear that the actuator 500 can thus be actuated to let the rotary shaft 420 coupled thereto perform a desired rotation about the axis of rotation G. On the side of the coupling 400 facing away from the actuator 500 and the approach mechanism 121, the rotary shaft 420 is also rotatably mounted in a securing disc 440 for the housing 123 of the picking element 122 by means of a suitable bearing 424. As can be seen, this securing disc 440 is in turn concentrically mounted in the frame 410 around the axis of rotation G by means of a suitable bearing 442. The end of the rotary shaft 420 facing away from the approach mechanism 121 is operatively connected to the drive mechanism 200 for the picking element 122. According to the illustrated exemplary embodiment, on this end of the rotary shaft 420, the second pulley 206 is attached which, together with the belt transmission 204 and the first pulley 202, forms the drive mechanism 200 for the picking element 122, as described above, in particular in connection with FIGS. 6a-c. Furthermore, the coupling 400 comprises a first selective coupling mechanism 450 which is active so as to couple the drive shaft 420 to and uncouple it from the securing disc 440 in a selective manner. According to the illustrated embodiment, this first coupling mechanism 450 comprises, for example, a magnetic coupling, a first end of which is provided on the rotary shaft 420 and a second part of which is provided on the securing disc 440. When actuating the first coupling mechanism 450, the securing disc 440, and thus also the attached housing 123 of the picking element 122, is coupled to the rotary shaft 420. If the first coupling mechanism 450 is not actuated, then the securing disc 440 and the attached housing are uncoupled from the rotary shaft 420. As is diagrammatically illustrated below, the embodiment from FIG. 14 furthermore also comprises a second coupling mechanism 460 which is active to selectively couple the securing disc 440 to the frame 410 of the coupling 400. According to the illustrated exemplary embodiment, this second coupling mechanism 460 may be configured as a linear actuator 462 which is attached to the frame 410 and on the movable side of which a brake element 464 is provided which can selectively be pushed against the securing disc 440. When the linear actuator 462 pushes the brake element 464 against the securing disc 440, then the securing disc is coupled to the frame 410 of the coupling 400. When the linear actuator 462 does not push the brake element 464 against the securing disc 440, then the securing disc 440 is uncoupled from the frame 410 of the coupling 400.

As described above, according to the embodiment shown in FIG. 14, the first working position of the coupling 400 is achieved when the first coupling mechanism 450 is in the coupled position and when the second coupling mechanism 460 is in the uncoupled position. In this first working position, both the second pulley 206 of the drive 200 and the securing disc 440 for the housing 123 are coupled to the drive shaft 420 and therefore also to the actuator 500 in order to rotate together about the axis of rotation G. Since both the housing 123 and this second pulley 206 do not execute any relative movement with respect to each other, the housing 123 will rotate without the picking element 122 performing an angular rotation with respect to this housing 123. In the second working position, according to the present embodiment, the first coupling mechanism 450 is uncoupled and the second coupling mechanism 460 is coupled. In the second working position, the securing disc 440 and the housing attached thereto are in this way uncoupled from the drive shaft 420 and thus also the actuator 500. In this case, the securing disc 440 is held in a fixed angular position with respect to the axis of rotation G by means of the second coupling 460. However, the second pulley 206 of the drive system 200 of the picking element 122 remains fixedly connected to the drive shaft 420 and thus the actuator 500. As a result thereof, a rotation of this drive shaft 420 by the actuator 500 will result in a relative angular rotation of the movable frame 1200 of the picking element 122 with respect to the housing 123 of the picking element 122, in which case the gripper mechanism 130 which is mounted to the picking element 122, as described above, may be driven by the picking element 122 to execute a rotation about the break point 300. Finally, the illustrated exemplary embodiment preferably also comprises a suitable slip ring 470 which makes it possible to feed electrical cables, for example for actuating and supplying actuators arranged in the housing 123 of the picking element 122 with power, which are supplied to the frame 410 of the coupling 400, to the housing 123 via this slip ring 470 and then via the securing disc 440 which is rotatably mounted in the frame 410. It will be clear that in this case, a first part of the slip ring 470 is provided on the frame 410 and that a second part of the slip ring 470, which is rotatable with respect to this first part, is provided on the securing disc 440. It will furthermore be clear that this first part is suitable to receive cables which are fed to the frame 410 and that the second part is suitable to pass cables through to the housing 123 of the picking element 122 via the securing disc 440.

Although the invention has been described above with reference to specific embodiments, the purpose thereof was to explain the invention and not to limit it. The person skilled in the art will understand that various modifications with respect to the described embodiments are possible without departing from the scope of the invention, the range of which is determined by the attached claims.

The invention claimed is:

1. A device for picking fruit, provided with:
an optical detection means, configured to detect and spatially locate a piece of fruit to be picked and hanging from a plant;
a robot arm, fitted with a gripper mechanism provided with at least two fingers; and
a processing unit, operatively connected to the optical detection means, the robot arm, and the gripper mechanism;
in which the processing unit is configured such that it actuates the robot arm to make the gripper mechanism move at least partly about the piece of fruit to be picked in an upward movement from below after a piece of fruit to be picked has been located by the optical detection means, the upward movement from below being defined with an angle which diverts less than 10 degrees from a substantially vertical first axis, wherein the fingers of the gripper mechanism are directed upwards during the upward movement from below of the gripper mechanism;
and in which the processing unit is configured such that it actuates the gripper mechanism, when it has been positioned around the piece of fruit to be picked, in order to:
grasp the piece of fruit to be picked between the at least two fingers, wherein the fingers of the gripper mechanism are directed upwards; and
rotate the gripper mechanism through a rotation angle in a range 70 and 110 degrees, independently from the robot arm, about a substantially horizontal axis such that the piece of fruit to be picked is rotated in such a way about the substantially horizontal axis or about a second axis situated in a plane which is at right angles to the direction of the stalk of the piece of fruit that it comes away from the plant.

2. The device according to claim 1, in which the processing unit is configured to rotate the piece of fruit to be picked about said second axis at an angle of at least 70°, and at most 110°.

3. The device according to claim 1, in which the gripper mechanism is configured such that the piece of fruit to be picked is rotated about a predetermined desired break point of the stalk of the piece of fruit.

4. The device according to claim 3, in which the gripper mechanism is configured such that breaking off the piece of fruit to be picked at said break point is controlled.

5. The device according to claim 3, in which, during rotation of the piece of fruit to be picked about said second axis, the spatial position of said break point does not change.

6. The device according to claim 1, in which a picking element is provided with a coordination means which coordinates the rotation of the gripper mechanism with the rotation of crossbars.

7. The device according to claim 6, in which said coordination means comprises a torsion spring and a pull cord.

8. The device according to claim 1, in which the processing unit is configured such that it actuates the robot arm and the gripper mechanism to
deposit the piece of fruit in a resulting orientation in a receptacle.

9. The device according to claim 1, in which the at least two fingers, on the side facing the fruit to be picked, are provided with an elongate, elastically deformable surface, which surface is configured to assume, upon contact with the piece of fruit to be picked, a concave shape which, viewed in a vertical plane, at least partly follows the contour of the piece of fruit to be picked.

10. The device according to claim 1, furthermore provided with an advancing mechanism, configured to drive the device substantially horizontally along a straight line.

11. The device according to claim 3, in which:
the robot arm comprises a picking element on which the gripper mechanism is provided and in which the picking element is configured to rotate the gripper mechanism about said break point during a picking operation after grasping the fruit to be picked;
the picking element comprising a linkage system with one degree of freedom and a remotely situated movement centre, in which:
the remotely situated movement centre coincides with said break point;
the gripper mechanism is arranged on the side of the linkage system facing the remotely situated movement centre; and
on the opposite side, the linkage system is fitted on a housing of the picking element, and the linkage system is operatively connected to a drive mechanism configured to rotate the gripper mechanism fitted thereto about said break point via the linkage system.

12. The device according to claim 11, in which said linkage system comprises a serial parallelogram-based linkage system.

13. The device according to claim 11, in which said linkage system comprises:
a first parallelogram with two crossbars which are provided on respective rotation points on the housing of the picking element and operatively connected to the drive mechanism;
a second parallelogram which has two parallel action bars, parallel to the line through said respective rotation points, and which is rotatably connected to the first parallelogram;
a third crossbar which is parallel to the crossbars of the first parallelogram and rotatably connected to the parallel action bars on the opposite side of the first parallelogram such that the third crossbar rotates about the remotely situated movement centre, and in which the gripper mechanism is provided on said third crossbar.

14. The device according to claim 11, in which the robot arm:
comprises a coupling to which the gripper mechanism is rotatably attached about an axis of rotation via a frame of a picking element; and
comprises an actuator attached to said coupling,
in which said coupling is configured to selectively operatively connect the actuator to the frame of the picking element or to a drive system of a movable frame of the picking element.

15. The device according to claim 14, in which the coupling is configured to:
in a first working position:

operatively connect the actuator to the frame in order to perform a rotation about the axis of rotation;

in a second working position:

uncouple the housing from the actuator;

keep the housing in its existing angular position with respect to the axis of rotation; and operatively connect the actuator to the drive mechanism of the movement frame of the picking element in order to perform a relative movement with respect to the housing of the picking element.

16. The device according to claim 1, in which the robot arm comprises an approach element, in which the approach element is configured to move the gripper mechanism on a movable end of the approach element to and fro, in which the approach element comprises a spring mechanism which acts on a deflection point provided on the approach element such that the resultant torque evolves in a similar way to the opposite torque generated by the weight of elements attached to the movable end of the approach element.

17. A process of using the device according to claim 1 for picking one or more of the following fruit:

strawberries;

tomatoes;

the species *Capsicum annuum*;

the species *Cucumis sativus*;

the genus *Rubus*;

the genus *Vaccinium*;

the genus *Ribes*.

18. The device according to claim 2, in which the processing unit is configured to rotate the piece of fruit to be picked about said second axis at an angle between 80° and 100°.

19. A device for picking fruit, provided with:

an optical detection means, configured to detect and spatially locate a piece of fruit to be picked and hanging from a plant;

a robot arm, fitted with a gripper mechanism provided with at least two fingers; and a processing unit, operatively connected to the optical detection means, the robot arm, and the gripper mechanism;

in which the processing unit is configured such that it actuates the robot arm to make the gripper mechanism move at least partly about the piece of fruit to be picked in an upward movement from below after a piece of fruit to be picked has been located by the optical detection means, the upward movement from below being defined with an angle which diverts less than 10 degrees from a substantially vertical first axis, wherein the fingers of the gripper mechanism are directed upwards during the upward movement from below of the gripper mechanism;

and in which the processing unit is configured such that it actuates the gripper mechanism, when it has been positioned around the piece of fruit to be picked, in order to:

grasp the piece of fruit to be picked between the at least two fingers, wherein the fingers of the gripper mechanism are directed upwards; and rotate the gripper mechanism through a rotation angle in a range 70 and 110 degrees, independently from the robot arm, about a substantially horizontal axis such that the piece of fruit to be picked is rotated in such a way about the substantially horizontal axis or about a second axis situated in a plane which is at right angles to the direction of the stalk of the piece of fruit that it comes away from the plant;

wherein the gripper mechanism defines a longitudinal axis and is fixed in a parallel orientation with the substantially vertical axis during movement at least partly about the piece of fruit to be picked in the upward movement from below;

wherein the at least two fingers, on the side facing the fruit to be picked, are provided with an elongate, elastically deformable surface, which surface is configured to assume, upon contact with the piece of fruit to be picked, a concave shape which, viewed in a vertical plane, at least partly follows the contour of the piece of fruit to be picked;

wherein the elongate, elastically deformable surface is configured to bear upon a soft plastic framework of the at least two fingers, the soft plastic framework comprising sufficient roundings.

20. A device for picking fruit, provided with:

an optical detection means, configured to detect and spatially locate a piece of fruit to be picked and hanging from a plant;

a robot arm, comprising a picking element provided with a movable frame, and fitted with a gripper mechanism provided with at least two fingers; and a processing unit, operatively connected to the optical detection means, the robot arm and the gripper mechanism;

in which the processing unit is configured such that it actuates the robot arm to make the gripper mechanism move at least partly about the piece of fruit to be picked in an upward movement from below after a piece of fruit to be picked has been located by the optical detection means, the upward movement from below being defined with an angle which diverts less than 10 degrees from a substantially vertical first axis, wherein the fingers of the gripper mechanism are directed upwards in from a first position in a closed state and remain passively closed during the upward movement from below of the gripper mechanism to a second position;

and in which the processing unit is configured such that it actuates the gripper mechanism, when it has been positioned around the piece of fruit to be picked at a second position, in order to:

open the at least two fingers at the second position after moving in an upward movement from below;

grasp the piece of fruit to be picked between the at least two fingers so that a predetermined break point coincides with a remotely situated movement center for rotating the gripper mechanism, the fingers of the gripper mechanism being directed upwards;

rotate the gripper mechanism through a rotation angle in a range 70 and 110 degrees, independently from the robot arm, about a substantially horizontal axis to a third position such that the piece of fruit to be picked is rotated in such a way about the substantially horizontal axis or about a second axis situated in a plane which is at right angles to the direction of the stalk of the piece of fruit that it comes away from the plant, the gripper mechanism is configured such that the piece of fruit to be picked is rotated about the predetermined desired break point of the stalk of the piece of fruit;

move to a downward orientation at a fourth position, such that the fingers are directed downwards, and open the fingers to release the piece of fruit; and reversely rotate the gripper mechanism and return the gripper mechanism to the first position.

21. A device for picking fruit, provided with:
an optical detection means, configured to detect and spatially locate a piece of fruit to be picked and hanging from a plant;
a robot arm, fitted with a gripper mechanism provided with at least two fingers; and
a processing unit, operatively connected to the optical detection means, the robot arm, and the gripper mechanism;
wherein the processing unit is configured such that it actuates the robot arm to make the gripper mechanism move at least partly about the piece of fruit to be picked in an upward movement from below after a piece of fruit to be picked has been located by the optical detection means, the upward movement from below being defined with an angle which diverts less than 10 degrees from a substantially vertical first axis, wherein the fingers of the gripper mechanism are directed upwards during the upward movement from below of the gripper mechanism;
wherein, at a part of the robot arm that is connected to the gripper mechanism, the robot arm is upwardly oriented during the upward movement from below;
wherein the processing unit is configured such that it actuates the gripper mechanism, when it has been positioned around the piece of fruit to be picked, in order to:
grasp the piece of fruit to be picked between the at least two fingers, wherein the fingers of the gripper mechanism are directed upwards; and
rotate the gripper mechanism through a rotation angle in a range 70 and 110 degrees, independently from the robot arm, about a substantially horizontal axis such that the piece of fruit to be picked is rotated in such a way about the substantially horizontal axis or about a second axis situated in a plane which is at right angles to the direction of the stalk of the piece of fruit that it comes away from the plant.

* * * * *